US012795644B2

(12) United States Patent
Park et al.

(10) Patent No.: US 12,795,644 B2
(45) Date of Patent: Nov. 10, 2026

(54) METHOD AND APPARATUS FOR PERFORMING COMMUNICATION BASED ON COT IN NR V2X

(71) Applicant: LG Electronics Inc., Seoul (KR)

(72) Inventors: Giwon Park, Seoul (KR); Seoyoung Back, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 18/128,488

(22) Filed: Mar. 30, 2023

(65) Prior Publication Data

US 2023/0319817 A1 Oct. 5, 2023

(30) Foreign Application Priority Data

Mar. 30, 2022 (KR) ........................ 10-2022-0039256
Mar. 23, 2023 (KR) ........................ 10-2023-0037689

(51) Int. Cl.
*H04W 72/1263* (2023.01)
*H04W 72/231* (2023.01)
*H04W 74/0808* (2024.01)

(52) U.S. Cl.
CPC ..... *H04W 72/1263* (2013.01); *H04W 72/231* (2023.01); *H04W 74/0808* (2013.01)

(58) Field of Classification Search
CPC ........... H04W 72/1263; H04W 72/231; H04W 72/25; H04W 74/0808
See application file for complete search history.

(56) References Cited

U.S. PATENT DOCUMENTS

| | | | | |
|---|---|---|---|---|
| 2020/0404586 | A1* | 12/2020 | Zhang | H04W 52/0216 |
| 2021/0092783 | A1 | 3/2021 | Sun et al. | |
| 2021/0400656 | A1* | 12/2021 | Luo | H04W 72/51 |
| 2021/0400720 | A1* | 12/2021 | Luo | H04W 74/0816 |
| 2023/0007956 | A1* | 1/2023 | Wu | H04L 27/2613 |
| 2023/0232428 | A1* | 7/2023 | Li | H04W 72/25 370/329 |

(Continued)

FOREIGN PATENT DOCUMENTS

| | | | |
|---|---|---|---|
| WO | WO-2021044075 A1 * | 3/2021 | H04W 74/0808 |
| WO | WO 2021/208031 | 10/2021 | |

OTHER PUBLICATIONS

Extended European Search Report in European Appln. No. 23164925.2, mailed on Jul. 14, 2023, 5 pages.

*Primary Examiner* — Huy D Vu
*Assistant Examiner* — Bao G Nguyen
(74) *Attorney, Agent, or Firm* — Fish & Richardson P.C.

(57) ABSTRACT

Provided are a method for performing wireless communication by a first device, and an apparatus for supporting same. The method may comprise: determining a channel occupancy time (COT) based on sensing for channel access; transmitting, to a second device, information related to the COT; transmitting, within the COT, first sidelink control information (SCI) for scheduling of a physical sidelink shared channel (PSSCH) and second SCI through a physical sidelink control channel (PSCCH); transmitting, within the COT, the second SCI and a medium access control (MAC) protocol data unit (PDU) through the PSSCH; determining to terminate the COT; and transmitting, to the second device, information related to COT termination based on the determination.

14 Claims, 23 Drawing Sheets

(56) References Cited

U.S. PATENT DOCUMENTS

| | | | | |
|---|---|---|---|---|
| 2024/0064713 | A1* | 2/2024 | Sun | H04W 72/25 |
| 2024/0334476 | A1* | 10/2024 | Hwang | H04W 72/25 |
| 2025/0142595 | A1* | 5/2025 | Deng | H04W 72/0446 |

* cited by examiner

1000(102/106, 202/206)

METHOD AND APPARATUS FOR PERFORMING COMMUNICATION BASED ON COT IN NR V2X

CROSS-REFERENCE TO RELATED APPLICATIONS

This application claims the benefit of Korean Patent Application No. 10-2022-0039256, filed on Mar. 30, 2022, and Korean Patent Application No. 10-2023-0037689, filed on Mar. 23, 2023, the contents of which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, even if a channel occupancy time (COT) is generated and/or shared, SL communication performed within the COT may (continuously) fail due to interference, transmission by other devices, etc. in an unlicensed band. Even if SL communication (continuously) fails within the COT due to transmission of traffic having high importance, aperiodic transmission by other devices, etc., if the UE (continuously) attempts SL communication within the COT, unnecessary waste of resources may occur and reliability of SL communication may not be guaranteed.

In one embodiment, provided is a method for performing wireless communication by a first device. The method may comprise: determining a channel occupancy time (COT) based on sensing for channel access; transmitting, to a second device, information related to the COT; transmitting, within the COT, first sidelink control information (SCI) for scheduling of a physical sidelink shared channel (PSSCH) and second SCI through a physical sidelink control channel (PSCCH); transmitting, within the COT, the second SCI and a medium access control (MAC) protocol data unit (PDU) through the PSSCH; determining to terminate the COT; and transmitting, to the second device, information related to COT termination based on the determination.

In one embodiment, provided is a first device adapted to perform wireless communication. The first device may comprise: at least one transceiver; at least one processor; and at least one memory connected to the at least one processor and storing instructions that, based on being executed by the at least one processor, perform operations comprising: determining a channel occupancy time (COT) based on sensing for channel access; transmitting, to a second device, information related to the COT; transmitting, within the COT, first sidelink control information (SCI) for scheduling of a physical sidelink shared channel (PSSCH) and second SCI through a physical sidelink control channel (PSCCH); transmitting, within the COT, the second SCI and a medium access control (MAC) protocol data unit (PDU) through the PSSCH; determining to terminate the COT; and transmitting, to the second device, information related to COT termination based on the determination.

In one embodiment, provided is a processing device adapted to control a first device. The processing device may comprise: at least one processor; and at least one memory connected to the at least one processor and storing instructions that, based on being executed by the at least one processor, perform operations comprising: determining a channel occupancy time (COT) based on sensing for channel access; transmitting, to a second device, information related to the COT; transmitting, within the COT, first sidelink control information (SCI) for scheduling of a physical sidelink shared channel (PSSCH) and second SCI through a physical sidelink control channel (PSCCH); transmitting, within the COT, the second SCI and a medium access control (MAC) protocol data unit (PDU) through the PSSCH; determining to terminate the COT; and transmitting, to the second device, information related to COT termination based on the determination.

The UE can efficiently perform SL communication in an unlicensed band.

DETAILED DESCRIPTION

Figure 1:
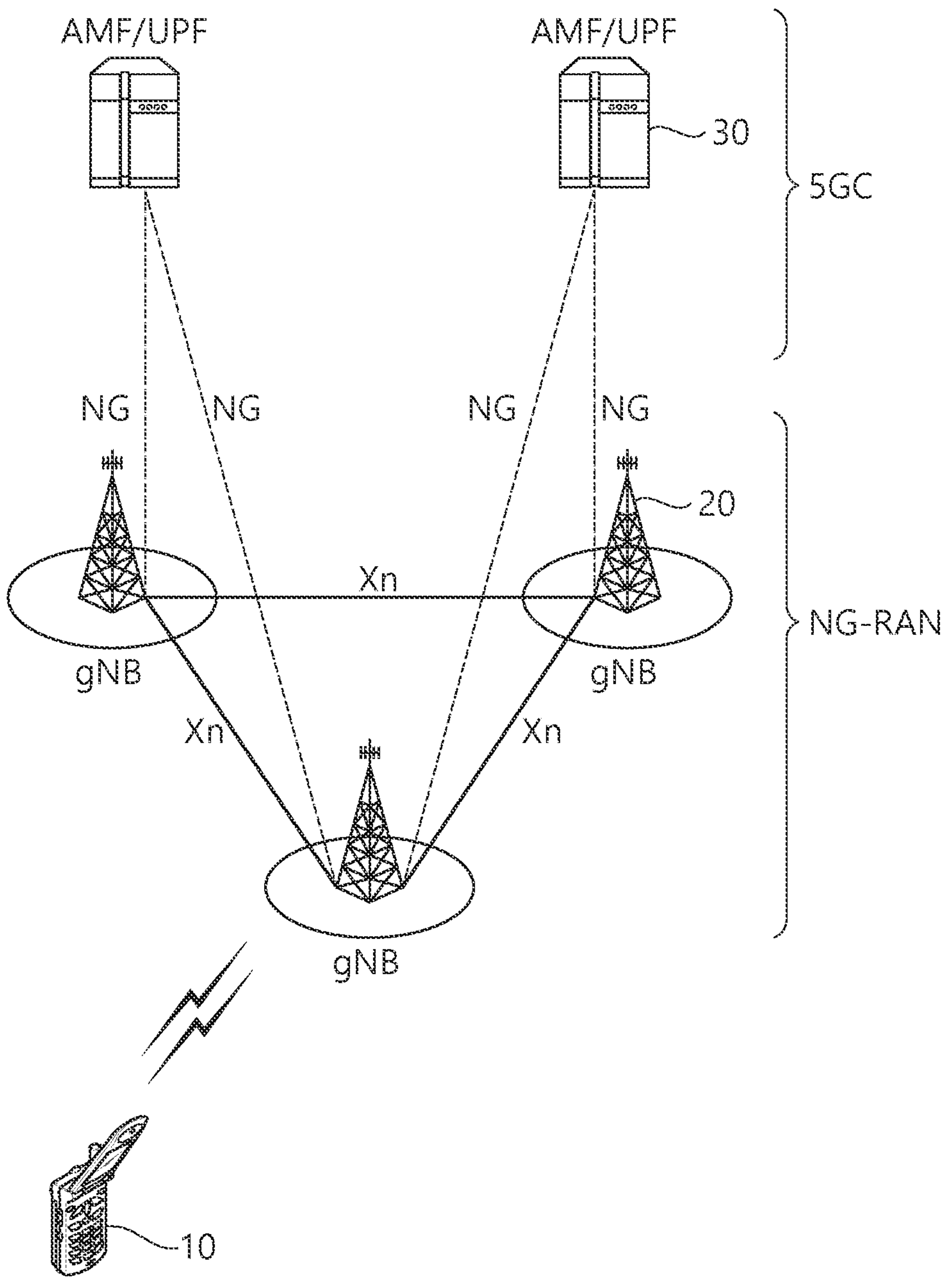
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if', or in case of may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
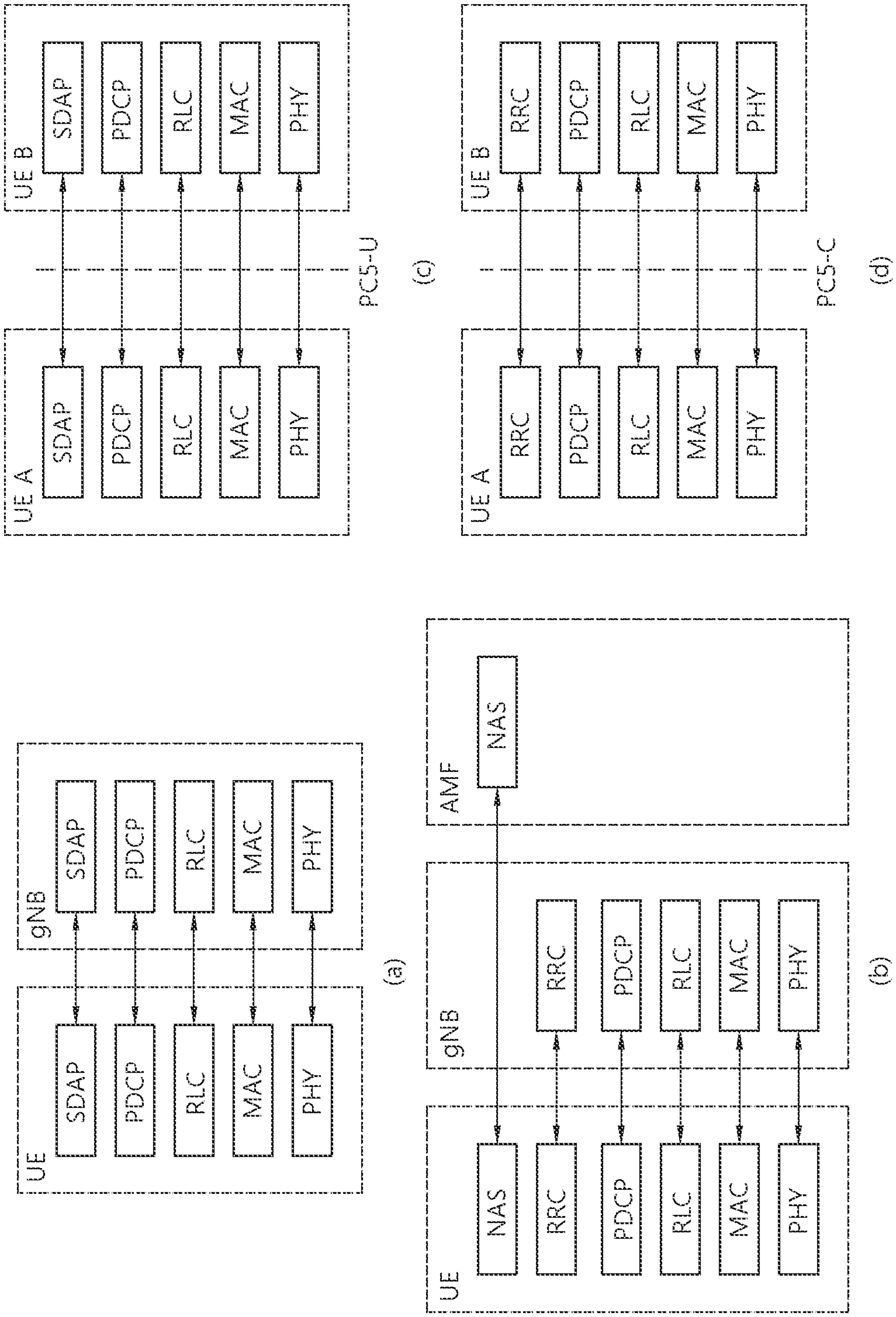
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
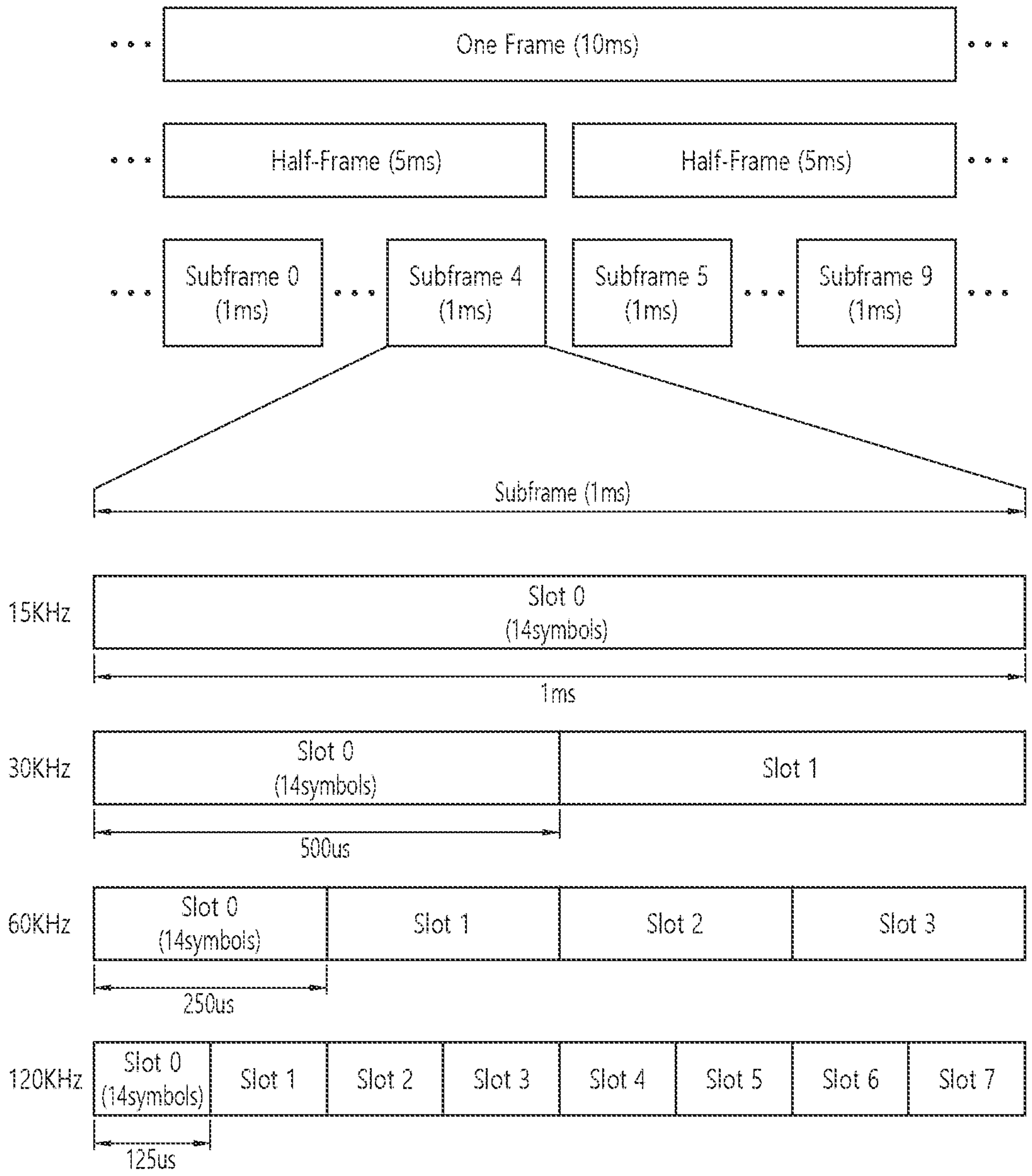
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N_{frame,\mu}^{slot}$), and a number of slots per subframe ($N_{subframe,\mu}^{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a “sub 6 GHz range”, and FR2 may mean an “above 6 GHz range” and may also be referred to as a millimeter wave (mmW).

TABLE 3

| Frequency Range designation | Corresponding frequency range | Subcarrier Spacing (SCS) |
|---|---|---|
| FR1 | 450 MHZ-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
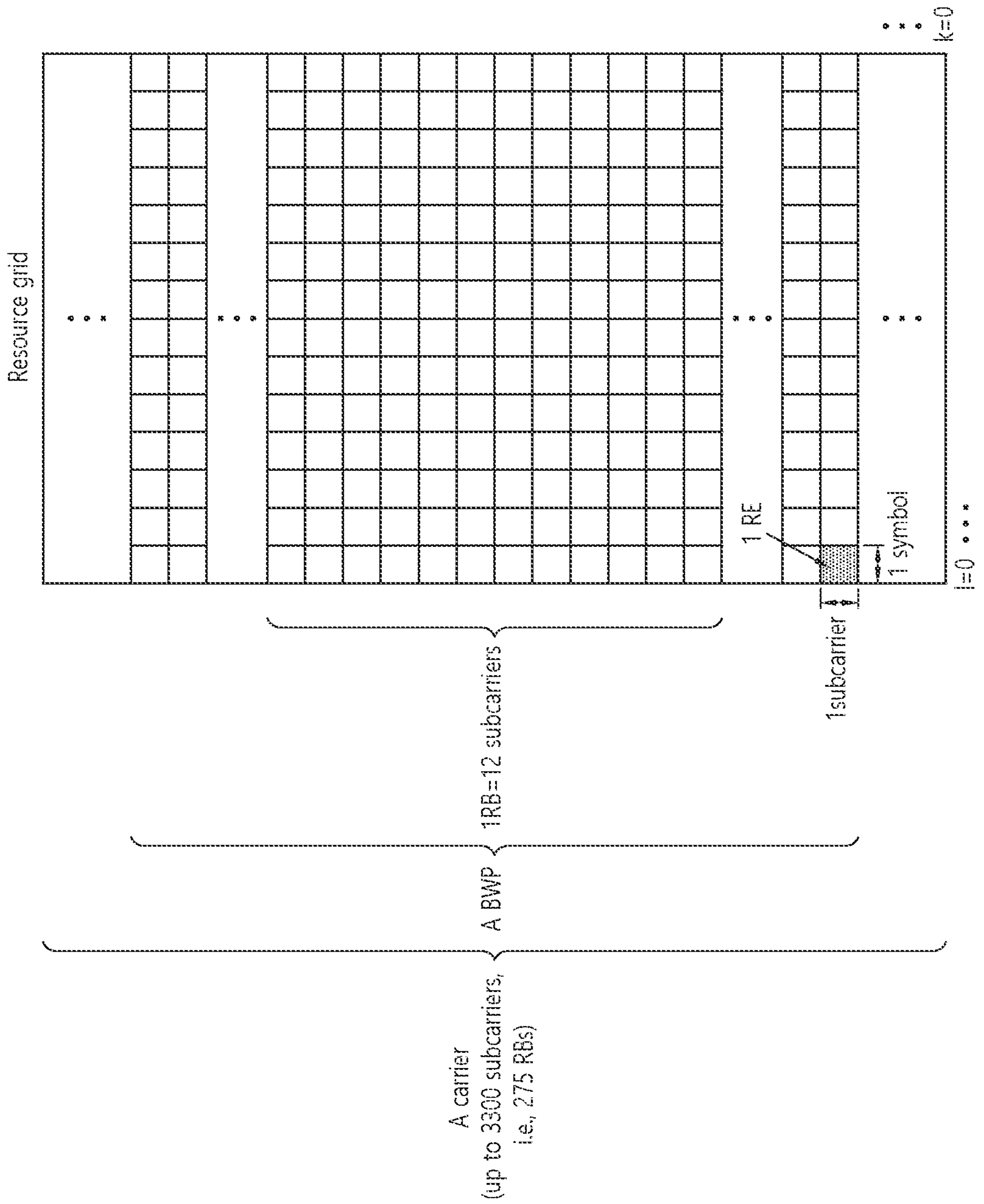
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
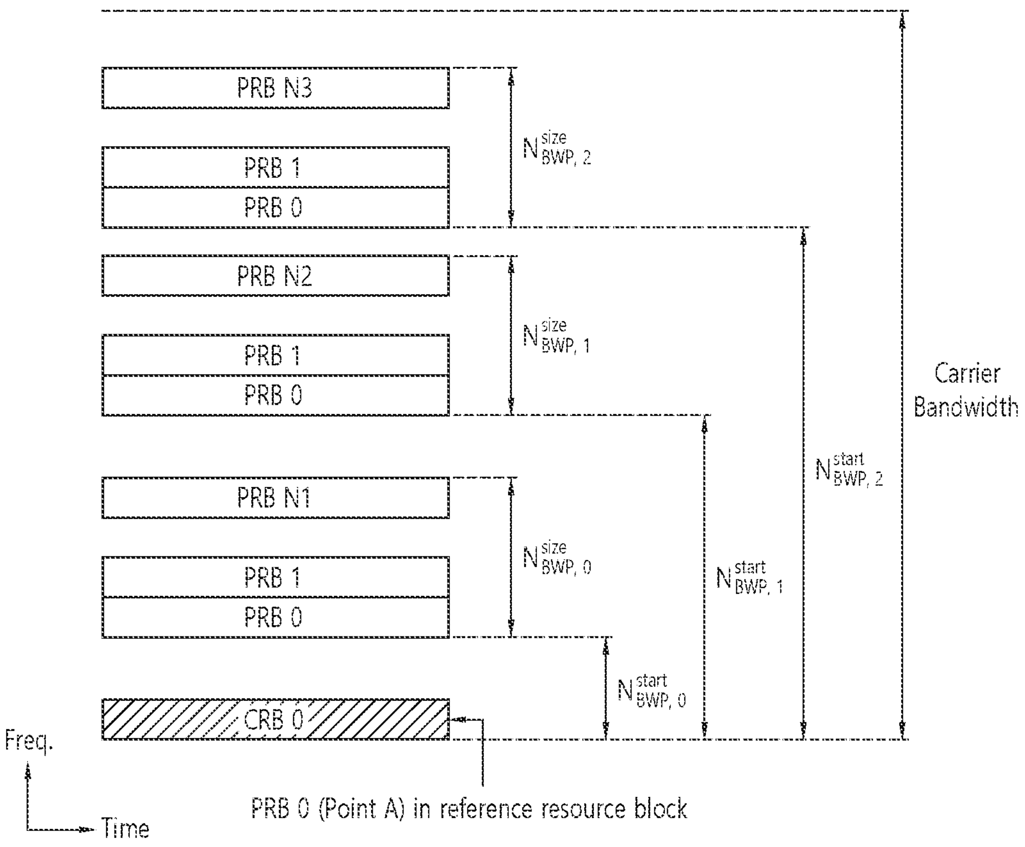
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
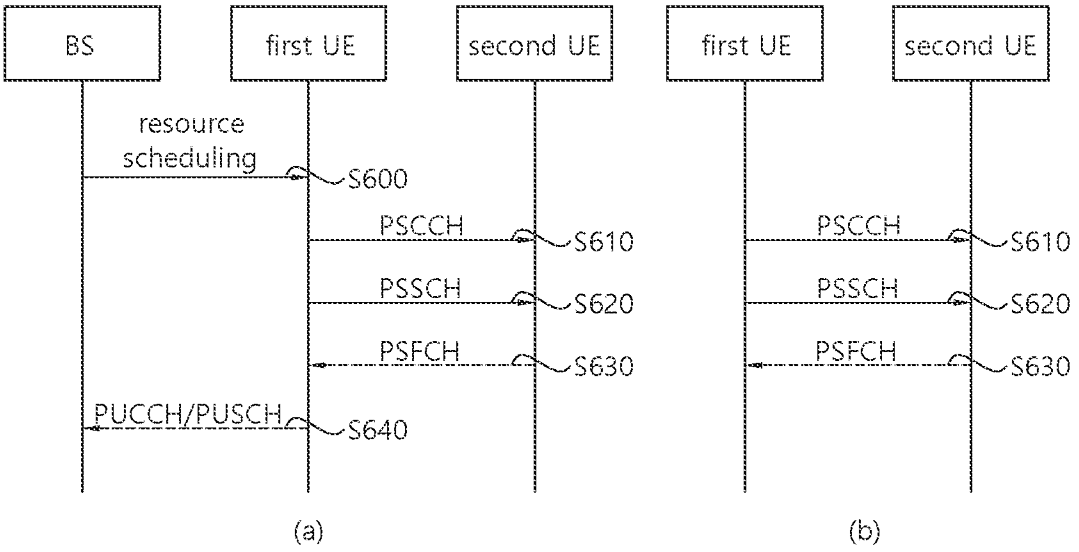
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and $2^{nd}$-stage-SCI on PSSCH.

The following information is transmitted by means of the SCI format 1-A:

- Priority—3 bits
- Frequency resource assignment—ceiling ($\log_2(N^{SL}_{subChannel}(N^{SL}_{subChannel}+1)/2)$) bits when the value of the higher layer parameter sl-MaxNumPerReserve is configured to 2; otherwise ceiling $\log^2(N^{SL}_{subChannel}(N^{SL}_{subChannel}+1)(2N^{SL}_{subChannel}+1)/6)$ bits when the value of the higher layer parameter sl-MaxNumPerReserve is configured to 3
- Time resource assignment—5 bits when the value of the higher layer parameter sl-MaxNumPerReserve is configured to 2; otherwise 9 bits when the value of the higher layer parameter sl-MaxNumPerReserve is configured to 3
- Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise
- DMRS pattern—ceiling ($\log_2 N_{pattern}$) bits, where $N_{pattern}$ is the number of DMRS patterns configured by higher layer parameter sl-PSSCH-DMRS-TimePatternList
- $2^{nd}$-stage SCI format—2 bits as defined in Table 5
- Beta offset indicator—2 bits as provided by higher layer parameter sl-BetaOffsets2ndSCI
- Number of DMRS port—1 bit as defined in Table 6
- Modulation and coding scheme—5 bits
- Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise
- PSFCH overhead indication—1 bit if higher layer parameter sl-PSFCH-Period=2 or 4; 0 bit otherwise
- Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number—4 bits
- New data indicator—1 bit
- Redundancy version—2 bits
- Source ID—8 bits
- Destination ID—16 bits
- HARQ feedback enabled/disabled indicator—1 bit
- Cast type indicator—2 bits as defined in Table 7
- CSI request—1 bit

TABLE 7

| Value of Cast type indicator | Cast type |
|---|---|
| 00 | Broadcast |
| 01 | Groupcast when HARQ-ACK information includes ACK or NACK |

TABLE 7-continued

| Value of Cast type indicator | Cast type |
|---|---|
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
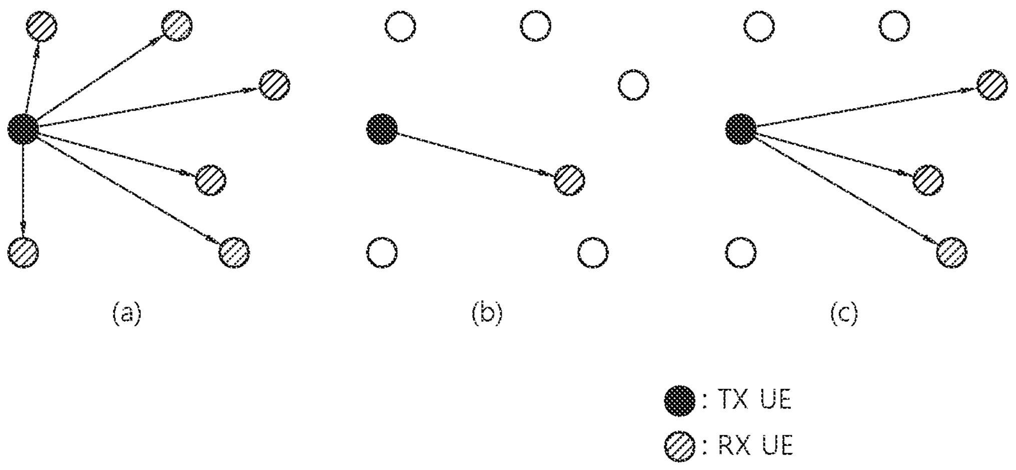
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

In various embodiments of the present disclosure, a TX UE and/or an RX UE may obtain a discontinuous reception (DRX) configuration. For example, the DRX configuration may include a Uu DRX configuration and/or a SL DRX configuration. For example, the TX UE may receive the DRX configuration from a base station, and the RX UE may receive the DRX configuration from the TX UE. For example, the DRX configuration may be configured or pre-configured for the TX UE and/or the RX UE.

For example, the Uu DRX configuration may include information related to drx-HARQ-RTT-Timer-SL and/or information related to drx-RetransmissionTimer-SL. For example, the timer may be used for the following purposes.

(1) drx-HARQ-RTT-Timer-SL (per HARQ process): drx-HARQ-RTT-Timer-SL may be the minimum duration before a sidelink HARQ retransmission grant is expected by the MAC entity. drx-HARQ-RTT-Timer-SL may refer to the minimum time required until a resource for SL mode 1 retransmission is prepared. That is, the resource for sidelink retransmission cannot be prepared before the drx-HARQ-RTT-Timer-SL timer. Accordingly, the TX UE can reduce power consumption by transitioning to a sleep mode during the drx-HARQ-RTT-Time-SL timer. Or, the TX UE may not perform mode 1 DCI monitoring from the base station. If the drx-HARQ-RTT-Timer-SL timer expires, the TX UE may determine that a resource for SL retransmission may be prepared. Accordingly, the TX UE may start the drx-RetransmissionTimer-SL timer and monitor whether resource(s) for SL HARQ retransmission is received. As soon as the drx-HARQ-RTT-Timer-SL timer expires, the SL HARQ retransmission resource(s) may or may not be received, so the TX UE may start the drx-Retransmission-Timer-SL timer, and the TX UE may monitor mode 1 DCI from the base station to receive resource(s) for SL HARQ retransmission. For example, the drx-HARQ-RTT-Timer-SL timer may be a duration in which the TX UE performing sidelink communication based on sidelink resource allocation mode 1 (e.g., the UE supporting Uu DRX operation) does not perform PDCCH (or DCI) monitoring for sidelink mode 1 resource allocation from the base station.

(2) drx-RetransmissionTimer-SL (per HARQ process): drx-RetransmissionTimer-SL may be the maximum duration until a grant for sidelink retransmission is received. That is, the drx-RetransmissionTimer-SL timer may be a timer started when the drx-HARQ-RTT-Timer-SL timer expires, and it may be a timer that allows the TX UE to transition to an active state for SL retransmission. Or, while the corresponding timer is running, the TX UE may monitor mode 1 DCI from the base station. The TX UE may start monitoring SL mode 1 DCI from the base station, in order to check whether retransmission resource(s) (i.e., grant for sidelink retransmission) to the RX UE is prepared, from a time when drx-RetransmissionTimer-SL starts. And, if retransmission resource(s) is prepared, the TX UE may perform sidelink HARQ retransmission to the RX UE. When transmitting a HARQ retransmission packet to the RX UE, the TX UE may stop the drx-RetransmissionTimer-SL timer. While the drx-RetransmissionTimer-SL timer is running, the UE may maintain an active state. For example, the drx-RetransmissionTimer-SL timer may be a duration in which the TX UE performing sidelink communication based on sidelink resource allocation mode 1 (e.g., the UE supporting Uu DRX operation) performs PDCCH (or DCI) monitoring for sidelink mode 1 resource allocation from the base station.

For example, the SL DRX configuration may include at least one parameter/information among parameters/information described below.

(1) SL drx-onDurationTimer: the duration at the beginning of a SL DRX Cycle (2) SL drx-SlotOffset: the delay before starting the sl drx-onDurationTimer (3) SL drx-InactivityTimer: the duration after the PSCCH occasion in which a PSCCH indicates a new SL transmission for the MAC entity (4) SL drx-RetransmissionTimer (per HARQ process or per sidelink process): the maximum duration until a retransmission is received (5) SL drx-HARQ-RTT-Timer (per HARQ process or per sidelink process): the minimum duration before PSCCH (Sidelink Control Information) & PSSCH for SL HARQ retransmission is expected by the MAC entity (6) SL drx-LongCycleStartOffset: the Long DRX cycle and drx-StartOffset which defines the subframe where the Long and Short DRX Cycle starts (7) SL drx-ShortCycle (optional): the Short DRX cycle (8) SL drx-ShortCycleTimer (optional): the duration the UE shall follow the Short DRX cycle (9) SL drx-HARQ-RTT-Timer (per sidelink process): the minimum duration before an assignment for HARQ retransmission is expected by the MAC entity

(10) SL drx-StartOffset: the subframe where the SL DRX cycle start

(11) SL drx-Cycle: SL DRX cycle

The SL DRX timer described in the present disclosure may be used for the following purposes.

(1) SL DRX onduration timer: the duration in which the UE performing the SL DRX operation should basically operate in an active time in order to receive a PSCCH/PSSCH from other UE(s)

(2) SL DRX inactivity timer: the duration extending the SL DRX onduration duration, which is the duration in which the UE performing the SL DRX operation should basically operate in the active time in order to receive the PSCCH/PSSCH from other UE(s)

For example, the UE may extend the SL DRX onduration timer by the SL DRX inactivity timer duration. In addition, if the UE receives a new packet (e.g., new PSSCH transmission) from other UE(s), the UE may extend the SL DRX onduration timer by starting the SL DRX inactivity timer.

For example, the SL DRX inactivity timer may be used for extending the SL DRX onduration duration, which is the duration in which the RX UE performing the SL DRX operation should basically operate in the active time in order to receive the PSCCH/PSSCH from other UE(s). That is, the SL DRX onduration timer may be extended by the SL DRX inactivity timer period. In addition, if the RX UE receives a new packet (e.g., new PSSCH transmission) from other TX UE(s), the RX UE may extend the SL DRX onduration timer by starting the SL DRX inactivity timer.

(3) SL DRX HARQ RTT timer: the duration in which the UE performing the SL DRX operation operates in a sleep mode until receiving a retransmission packet (or PSSCH assignment) transmitted by other UE(s)

For example, if the UE starts the SL DRX HARQ RTT timer, the UE may determine that other UE(s) will not transmit a sidelink retransmission packet to the UE until the SL DRX HARQ RTT timer expires, and the UE may operate in a sleep mode while the corresponding timer is running. For example, if the UE starts the SL DRX HARQ RTT timer, the UE may not monitor a sidelink retransmission packet from other UE(s) until the SL DRX HARQ RTT timer expires. For example, if the RX UE which has received a PSCCH/PSSCH transmitted by the TX UE transmits SL HARQ NACK feedback, the RX UE may start the SL DRX HARQ RTT timer. In this case, the RX UE may determine that other TX UE(s) will not transmit a sidelink retransmission packet to the RX UE until the SL DRX HARQ RTT timer expires, and the RX UE may operate in a sleep mode while the corresponding timer is running.

(4) SL DRX retransmission timer: the timer which starts when the SL DRX HARQ RTT timer expires, and the duration in which the UE performing the SL DRX operation operates in an active time in order to receive a retransmission packet (or PSSCH assignment) transmitted by other UE(s)

For example, for the corresponding timer duration, the UE may receive or monitor a retransmission sidelink packet (or PSSCH assignment) transmitted by other UE(s). For example, the RX UE may receive or monitor a retransmission sidelink packet (or PSSCH assignment) transmitted by other TX UE(s) while the SL DRX retransmission timer is running. In the present disclosure, the names of the timer (drx-HARQ-RTT-Timer-SL, drx-RetransmissionTimer-SL, Sidelink DRX Onduration Timer, Sidelink DRX Inactivity Timer, Sidelink DRX HARQ RTT Timer, Sidelink DRX Retransmission Timer, etc.) is exemplary, and a timer performing the same/similar function based on the contents described in each timer may be considered as the same/similar timer regardless of the names of the timer.

The UE performing a sidelink DRX operation may operate in an active mode during a DRX active time (e.g., an on-duration timer, an inactivity timer, a retransmission timer, or a period operating in an active mode) and may perform PSCCH/PSSCH monitoring. However, the UE may operate in a sleep mode in a sidelink DRX inactive time period and may not perform PSCCH/PSSCH monitoring for SL data reception.

In sidelink unicast, the UE may negotiate/determine a sidelink DRX configuration (SL DRX configuration to be used during sidelink unicast communication) with a counterpart UE with which a unicast connection is established. If there is a connection (RRC connection) between the transmitting UE and the base station, the base station of the transmitting UE may configure a SL DRX configuration to be used by the receiving UE having a unicast connection with the transmitting UE and may inform the transmitting UE of the SL DRX configuration, and the transmitting UE may transmit the SL DRX configuration to be used by the receiving UE received from the base station to the receiving UE through a PC5 RRC message. If there is no connection (RRC connection) between the transmitting UE and the base station, the transmitting UE may autonomously configure a SL DRX configuration to be used by the receiving UE having a unicast connection with the transmitting UE and may transmit the SL DRX configuration to the receiving UE through a PC5 RRC message.

SL DRX is an operation for the receiving UE, but the transmitting UE should also know a SL DRX operating status of the receiving UE (an active mode, a sleep mode, a start time of DRX onduration/inactivity/HARQ RTT/retransmit timer, an expiration time of DRX onduration/inactivity/HARQ RTT/retransmit timer, etc.). For example, when allocating resources and performing transmission, the transmitting UE should be able to determine whether the receiving UE is operating in an active mode or a sleep mode. Therefore, the transmitting UE may maintain the same operating status as the receiving UE, such as the SL DRX timer, by applying the same SL DRX configuration as the receiving UE.

An AS layer of the UE (RX UE or TX UE) supporting the SL DRX operation may receive a Tx profile mapped to an available sidelink service from a higher layer (e.g., V2X layer). The Tx profile may include information for identifying whether an available sidelink service or a sidelink service of interest is a sidelink service for which the SL DRX operation should be performed or not. Therefore, if the AS layer of the UE receives available sidelink data (or sidelink service of interest) and the Tx profile from the higher layer, the UE may determine (or decide) whether the SL DRX operation should be supported for available sidelink data (or sidelink service of interest) or not.

The TX UE performing SL transmission (or resource (re)selection operation) based on sidelink mode 2 resource allocation operation may perform a process of reselecting transmission resources reserved for previous SL data (or previous SL TB). For example, the TX UE may perform an operation of reselecting transmission resources reserved for previous SL data (or previous SL TB), due to congestion control, NR SL dropping by NR SL/LTE SL prioritization, SL dropping by UL/SL prioritization, preemption, etc.

The transmitting UE may include information on up to three resources in SCI and transmit the SCI to the receiving UE, including information on a resource related to a currently transmitted PSSCH and information on two retransmission resources.

If the transmitting UE transmits a HARQ Feedback Disabled MAC PDU to the receiving UE and the receiving UE checks a HARQ feedback mode indicator set to HARQ Feedback Disabled included in SCI, the receiving UE which has received a PSCCH/PSSCH may not transmit SL HARQ feedback to the transmitting UE, and the receiving UE may monitor a PSCCH/PSSCH additionally transmitted by the transmitting UE. The transmitting UE may also perform additional PSCCH/PSSCH transmission (blind transmission) without receiving HARQ feedback (ACK or NACK) from the receiving UE when transmitting the HARQ Feedback Disabled MAC PDU.

Meanwhile, in the conventional unlicensed spectrum (NR-U), a communication method between a UE and a base station is supported in an unlicensed band. In addition, a mechanism for supporting communication in an unlicensed band between sidelink UEs is planned to be supported in Rel-18.

In the present disclosure, a channel may refer to a set of frequency domain resources in which Listen-Before-Talk (LBT) is performed. In NR-U, the channel may refer to an LBT bandwidth with 20 MHz and may have the same meaning as an RB set. For example, the RB set may be defined in section 7 of 3GPP TS 38.214 V17.0.0.

In the present disclosure, channel occupancy (CO) may refer to time/frequency domain resources obtained by the base station or the UE after LBT success.

In the present disclosure, channel occupancy time (COT) may refer to time domain resources obtained by the base station or the UE after LBT success. It may be shared between the base station (or the UE) and the UE (or the base station) that obtained the CO, and this may be referred to as COT sharing. Depending on the initiating device, this may be referred to as gNB-initiated COT or UE-initiated COT.

Hereinafter, a wireless communication system supporting an unlicensed band/shared spectrum will be described.

Figure 8:
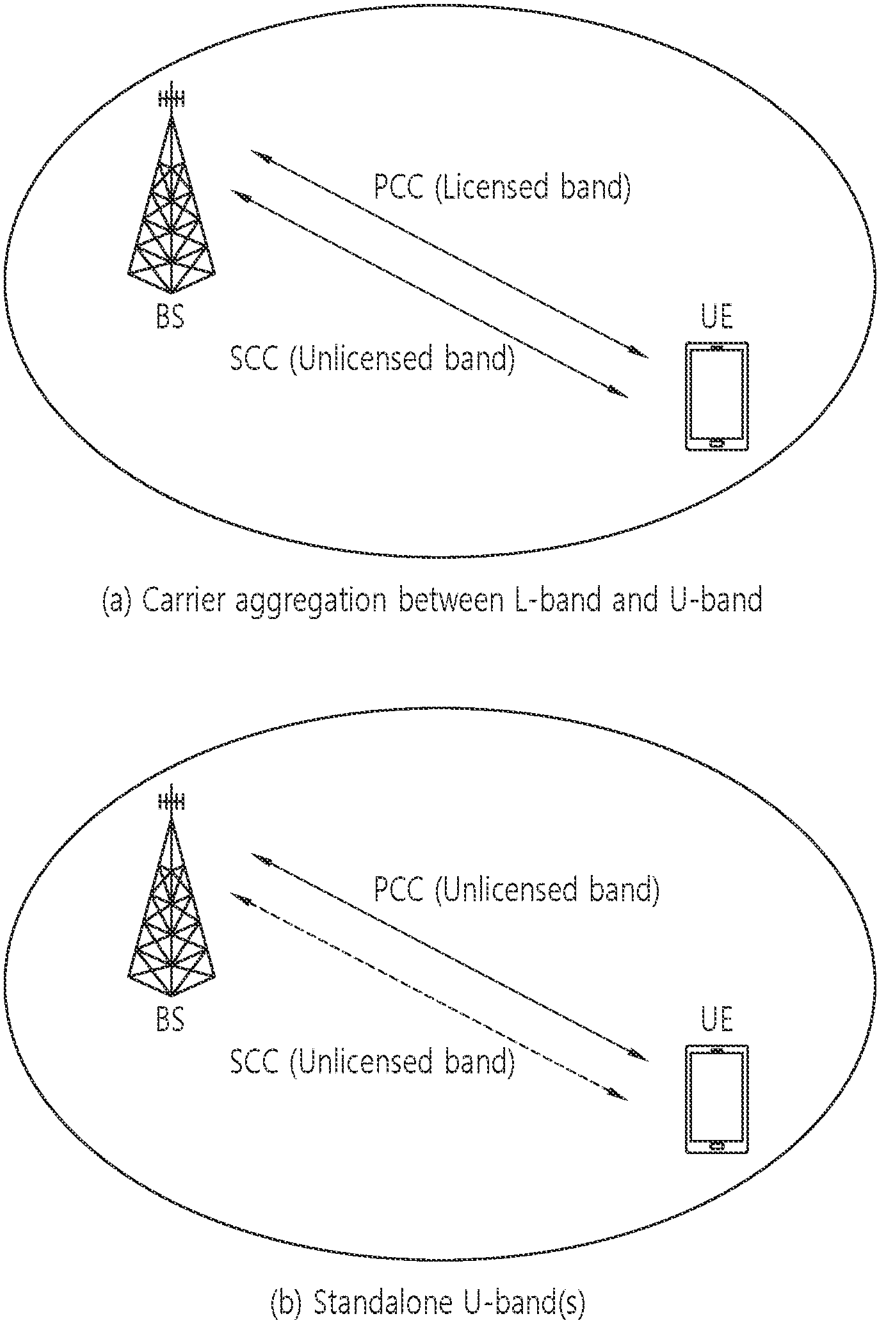
FIG. 8 shows an example of a wireless communication system supporting an unlicensed band, based on an embodiment of the present disclosure.

FIG. 8 shows an example of a wireless communication system supporting an unlicensed band, based on an embodiment of the present disclosure. For example, FIG. 8 may include an unlicensed spectrum (NR-U) wireless communication system. The embodiment of FIG. 8 may be combined with various embodiments of the present disclosure.

In the following description, a cell operating in a licensed band (hereinafter, L-band) may be defined as an L-cell, and a carrier of the L-cell may be defined as a (DL/UL/SL) LCC. In addition, a cell operating in an unlicensed band (hereinafter, U-band) may be defined as a U-cell, and a carrier of the U-cell may be defined as a (DL/UL/SL) UCC. The carrier/carrier-frequency of a cell may refer to the operating frequency (e.g., center frequency) of the cell. A cell/carrier (e.g., CC) is commonly called a cell.

When the base station and the UE transmit and receive signals on carrier-aggregated LCC and UCC as shown in (a) of FIG. 8, the LCC and the UCC may be configured as a primary CC (PCC) and a secondary CC (SCC), respectively. The base station and the UE may transmit and receive signals on one UCC or on a plurality of carrier-aggregated UCCs as shown in (b) of FIG. 8. In other words, the base station and the UE may transmit and receive signals only on UCC(s) without using any LCC. For a standalone operation, PRACH transmission, PUCCH transmission, PUSCH transmission, SRS transmission, etc. may be supported on a UCell.

In the embodiment of FIG. 8, the base station may be replaced with the UE. In this case, for example, PSCCH transmission, PSSCH transmission, PSFCH transmission, S-SSB transmission, etc. may be supported on a UCell.

Unless otherwise noted, the definitions below are applicable to the following terminologies used in the present disclosure.

Channel: a carrier or a part of a carrier composed of a contiguous set of RBs in which a channel access procedure is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}$=9 us. The base station or the UE senses a channel during a sensing slot duration. If power detected for at least 4 us within the sensing slot duration is less than an energy detection threshold $X_{thresh}$, the sensing slot duration $T_{sl}$ is considered to be idle. Otherwise, the sensing slot duration $T_{sl}$=9 us is considered to be busy. CAP may also be referred to as listen before talk (LBT).

Channel occupancy: transmission(s) on channel(s) by the base station/UE after a channel access procedure.

Channel occupancy time (COT): a total time during which the base station/UE and any base station/UE(s) sharing channel occupancy can perform transmission(s) on a channel after the base station/UE perform a channel access procedure. In the case of determining COT, if a transmission gap is less than or equal to 25 us, the gap duration may be counted in the COT. The COT may be shared for transmission between the base station and corresponding UE(s).

DL transmission burst: a set of transmissions without any gap greater than 16 us from the base station. Transmissions from the base station, which are separated by a gap exceeding 16 us are considered as separate DL transmission bursts. The base station may perform transmission(s) after a gap without sensing channel availability within a DL transmission burst.

UL or SL transmission burst: a set of transmissions without any gap greater than 16 us from the UE. Transmissions from the UE, which are separated by a gap exceeding 16 us are considered as separate UL or SL transmission bursts. The UE may perform transmission(s) after a gap without sensing channel availability within a UL or SL transmission burst.

Discovery burst: a DL transmission burst including a set of signal(s) and/or channel(s) confined within a window and associated with a duty cycle. In the LTE-based system, the discovery burst may be transmission(s) initiated by the base station, which includes PSS, an SSS, and cell-specific RS (CRS) and further includes non-zero power CSI-RS. In the NR-based system, the discover burst may be transmission(s) initiated by the base station, which includes at least an SS/PBCH block and further includes CORESET for a PDCCH scheduling a PDSCH carrying SIB1, the PDSCH carrying SIB1, and/or non-zero power CSI-RS.

Figure 9:
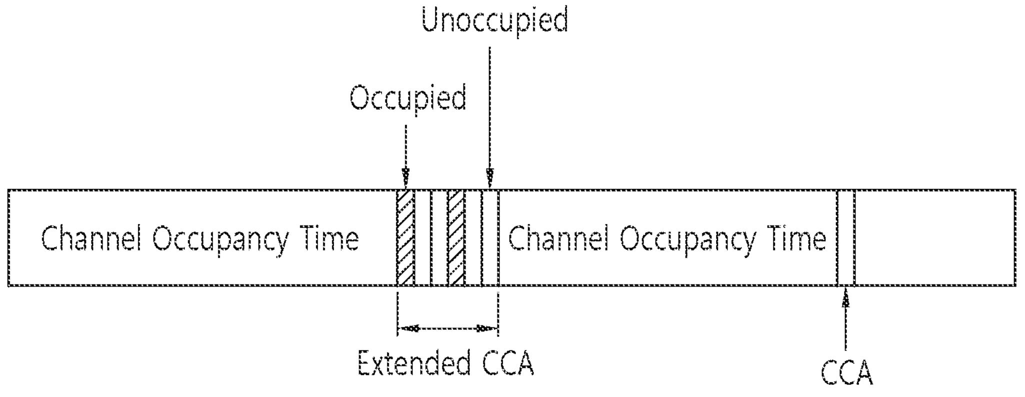
FIG. 9 shows a method of occupying resources in an unlicensed band, based on an embodiment of the present disclosure.

FIG. 9 shows a method of occupying resources in an unlicensed band, based on an embodiment of the present disclosure. The embodiment of FIG. 9 may be combined with various embodiments of the present disclosure.

Referring to FIG. 9, a communication node (e.g., base station, UE) within an unlicensed band should determine whether other communication node(s) is using a channel before signal transmission. To this end, the communication node within the unlicensed band may perform a channel access procedure (CAP) to access channel(s) on which transmission(s) is performed. The channel access procedure may be performed based on sensing. For example, the communication node may perform carrier sensing (CS) before transmitting signals so as to check whether other communication node(s) perform signal transmission. When the other communication node(s) perform no signal transmission, it is said that clear channel assessment (CCA) is confirmed. If a CCA threshold (e.g., $X_{Thresh}$) is predefined or configured by a higher layer (e.g., RRC), the communication node may determine that the channel is busy if the detected channel energy is higher than the CCA threshold. Otherwise, the communication node may determine that the channel is idle. If it is determined that the channel is idle, the communication node may start the signal transmission in the unlicensed band. The CAP may be replaced with the LBT.

Table 8 shows an example of the channel access procedure (CAP) supported in NR-U.

TABLE 8

| | Type | Explanation |
|---|---|---|
| DL | Type 1 CAP | CAP with random back-off<br>time duration spanned by the sensing slots that are sensed to be idle before a downlink transmission(s) is random |
| | Type 2 CAP-<br>Type 2A, 2B, 2C | CAP without random back-off<br>time duration spanned by sensing slots that are sensed to be idle before a downlink transmission(s) is deterministic |
| UL or SL | Type 1 CAP | CAP with random back-off<br>time duration spanned by the sensing slots that are sensed to be idle before an uplink or sidelink transmission(s) is random |
| | Type 2 CAP-<br>Type 2A, 2B, 2C | CAP without random back-off<br>time duration spanned by sensing slots that are sensed to be idle before an uplink or sidelink transmission(s) is deterministic |

Referring to Table 8, the LBT type or CAP for DL/UL/SL transmission may be defined. However, Table 8 is only an example, and a new type or CAP may be defined in a similar manner. For example, the type 1 (also referred to as Cat-4 LBT) may be a random back-off based channel access procedure. For example, in the case of Cat-4, the contention window may change. For example, the type 2 can be performed in case of COT sharing within COT acquired by the base station (gNB) or the UE.

Hereinafter, LBT-SubBand (SB) (or RB set) will be described.

In a wireless communication system supporting an unlicensed band, one cell (or carrier (e.g., CC)) or BWP configured for the UE may have a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 10:
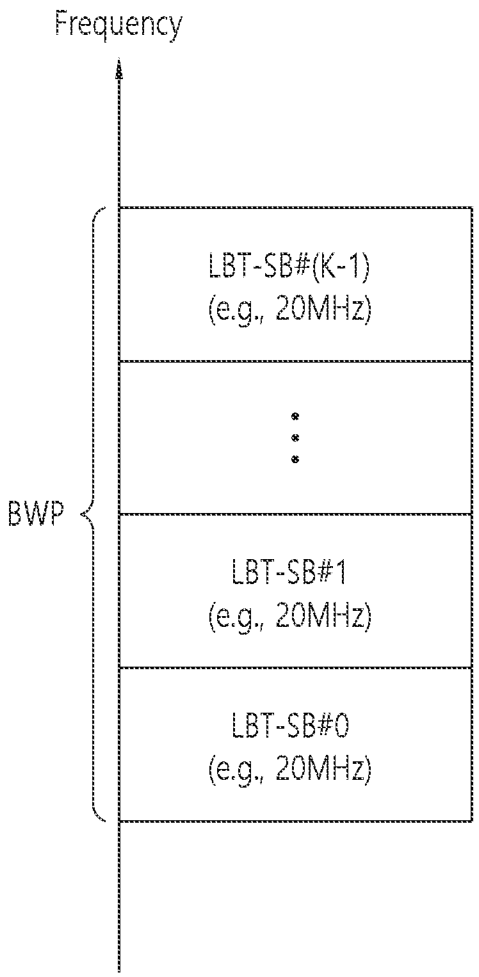
FIG. 10 shows a case in which a plurality of LBT-SBs are included in an unlicensed band, based on an embodiment of the present disclosure.

FIG. 10 shows a case in which a plurality of LBT-SBs are included in an unlicensed band, based on an embodiment of the present disclosure. The embodiment of FIG. 10 may be combined with various embodiments of the present disclosure.

Referring to FIG. 10, a plurality of LBT-SBs may be included in the BWP of a cell (or carrier). An LBT-SB may have, for example, a 20-MHz band. The LBT-SB may include a plurality of contiguous (P)RBs in the frequency domain, and thus may be referred to as a (P)RB set. While not shown, a guard band (GB) may be interposed between LBT-SBs. Accordingly, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined in an increasing order from the lowest frequency to the highest frequency.

Hereinafter, a channel access priority class (CAPC) will be described.

The CAPCs of MAC CEs and radio bearers may be fixed or configured to operate in FR1:

- Fixed to lowest priority for padding buffer status report (BSR) and recommended bit rate MAC CE;
- Fixed to highest priority for SRB0, SRB1, SRB3 and other MAC CEs;
- Configured by the base station for SRB2 and DRB.

When selecting a CAPC of a DRB, the base station considers fairness between other traffic types and transmissions while considering 5QI of all QoS flows multiplexed to the corresponding DRB. Table 9 shows which CAPC should be used for standardized 5QI, that is, a CAPC to be used for a given QoS flow. For standardized 5QI, CAPCs are defined as shown in the table below, and for non-standardized 5QI, the CAPC with the best QoS characteristics should be used.

TABLE 9

| CAPC | 5QI |
|---|---|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

NOTE:
A lower CAPC value indicates a higher priority.

Hereinafter, a method of transmitting a downlink signal through an unlicensed band will be described. For example, a method of transmitting a downlink signal through an unlicensed band may be applied to a method of transmitting a sidelink signal through an unlicensed band.

The base station may perform one of the following channel access procedures (e.g., CAP) for downlink signal transmission in an unlicensed band.

(1) Type 1 downlink (DL) CAP Method.

In the type 1 DL CAP, the length of a time duration spanned by sensing slots sensed to be idle before transmission(s) may be random. The type 1 DL CAP may be applied to the following transmissions:

- Transmission(s) initiated by the base station including (i) a unicast PDSCH with user plane data or (ii) the unicast PDSCH with user plane data and a unicast PDCCH scheduling user plane data, or
- Transmission(s) initiated by the base station including (i) a discovery burst only or (ii) a discovery burst multiplexed with non-unicast information.

Figure 11:
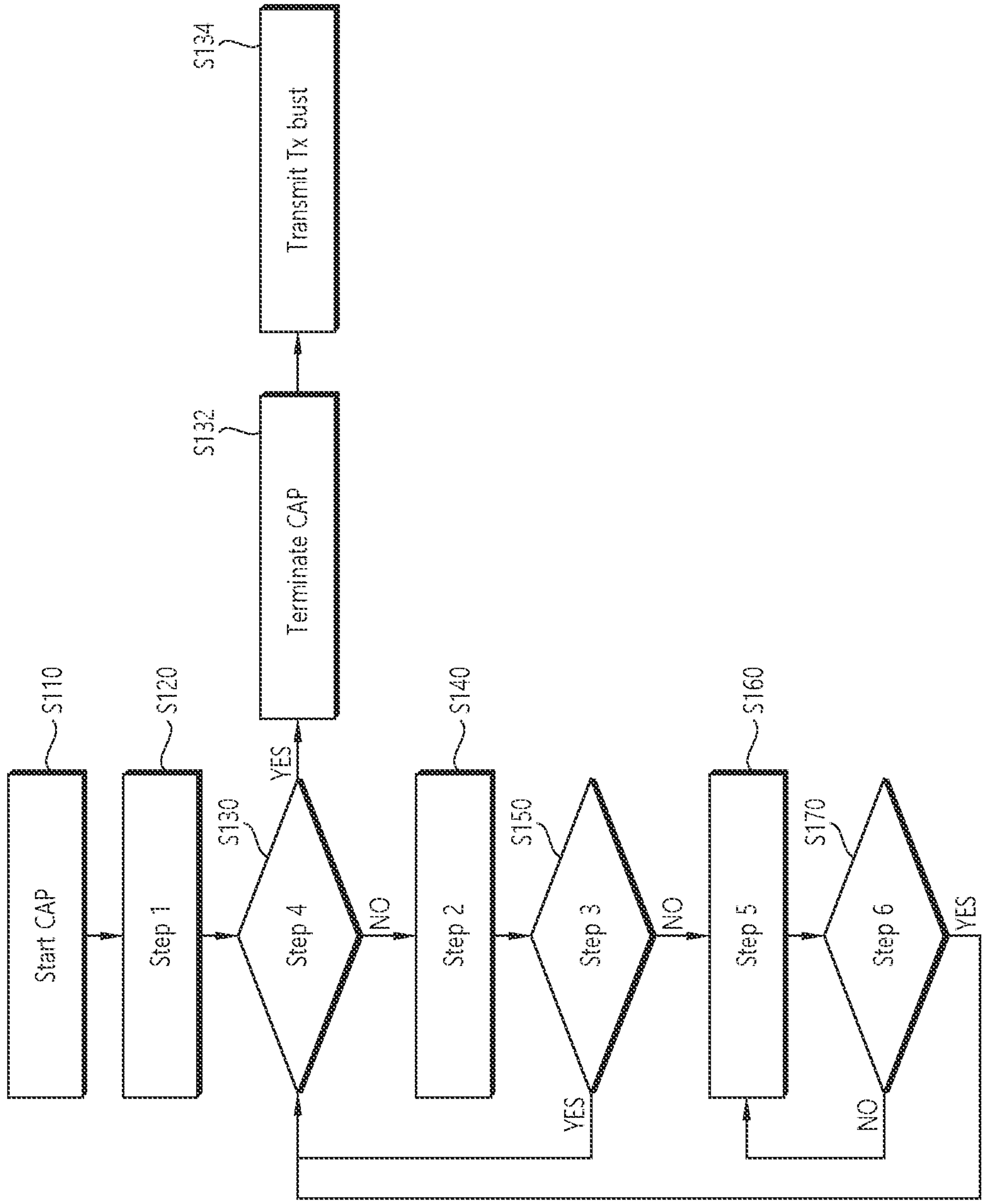
FIG. 11 shows CAP operations performed by a base station to transmit a downlink signal through an unlicensed band, based on an embodiment of the present disclosure.

FIG. 11 shows CAP operations performed by a base station to transmit a downlink signal through an unlicensed band, based on an embodiment of the present disclosure. The embodiment of FIG. 11 may be combined with various embodiments of the present disclosure.

Referring to FIG. 11, the base station may sense whether a channel is idle for sensing slot durations of a defer duration $T_d$. Then, if a counter N is zero, the base station may perform transmission (S134). In this case, the base station may adjust the counter N by sensing the channel for additional sensing slot duration(s) according to the following steps:

Step 1) (S120) The base station sets N to $N_{init}$ ($N=N_{init}$), where $N_{init}$ is a random number uniformly distributed between 0 and $CW_p$. Then, step 4 proceeds.

Step 2) (S140) If N>0 and the base station determines to decrease the counter, the base station sets N to N−1 (N=N−1).

Step 3) (S150) The base station senses the channel for the additional sensing slot duration. If the additional sensing slot duration is idle (Y), step 4 proceeds. Otherwise (N), step proceeds.

Step 4) (S130) If N=0 (Y), the base station terminates the CAP (S132). Otherwise (N), step 2 proceeds.

Step 5) (S160) The base station senses the channel until either a busy sensing slot is detected within an additional defer duration $T_d$ or all the slots of the additional defer duration $T_d$ are detected to be idle.

Step 6) (S170) If the channel is sensed to be idle for all the slot durations of the additional defer duration $T_d$ (Y), step 4 proceeds. Otherwise (N), step 5 proceeds.

Table 10 shows that $m_p$, a minimum contention window (CW), a maximum CW, a maximum channel occupancy time (MCOT), and an allowed CW size, which are applied to the CAP, vary depending on channel access priority classes.

TABLE 10

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Referring to Table 10, a contention window size (CWS), a maximum COT value, etc. for each CAPC may be defined. For example, $T_d$ may be equal to $T_f+m_p*T_{sl}$ ($T_d=T_f+m_p*T_{sl}$).

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16 us duration.

The following relationship is satisfied: $CW_{min,p}<=CW_p<=CW_{max,p}$. $CW_p$ may be configured by $CW_p=CW_{min,p}$ and updated before step 1 based on HARQ-ACK feedback (e.g., the ratio of ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next higher allowed value or maintained as it is.

(2) Type 2 downlink (DL) CAP Method.

In the type 2 DL CAP, the length of a time duration spanned by sensing slots sensed to be idle before transmission(s) may be determined. The type 2 DL CAP is classified into type 2A/2B/2C DL CAPs.

The type 2A DL CAP may be applied to the following transmissions. In the type 2A DL CAP, the base station may perform transmission immediately after the channel is sensed to be idle at least for a sensing duration $T_{short\_dl}$=25 us. Herein, $T_{short\_dl}$ includes the duration $T_f$(=16 us) and one sensing slot duration immediately after the duration $T_f$, where the duration $T_f$ includes a sensing slot at the beginning thereof

- Transmission(s) initiated by the base station including (i) a discovery burst only or (ii) a discovery burst multiplexed with non-unicast information, or
- Transmission(s) by the base station after a gap of 25 us from transmission(s) by the UE within a shared channel occupancy.

The type 2B DL CAP is applicable to transmission(s) performed by the base station after a gap of 16 us from transmission(s) by the UE within a shared channel occupancy time. In the type 2B DL CAP, the base station may perform transmission immediately after the channel is sensed to be idle for $T_f$=16 us. $T_f$ includes a sensing slot within 9 us from the end of the duration. The type 2C DL CAP is applicable to transmission(s) performed by the base station after a maximum of 16 us from transmission(s) by the UE within the shared channel occupancy time. In the type 2C DL CAP, the base station does not perform channel sensing before performing transmission.

Hereinafter, a method of transmitting an uplink signal through an unlicensed band will be described. For example, a method of transmitting an uplink signal through an unlicensed band may be applied to a method of transmitting a sidelink signal through an unlicensed band.

The UE may perform type 1 or type 2 CAP for UL signal transmission in an unlicensed band. In general, the UE may perform the CAP (e.g., type 1 or type 2) configured by the base station for UL signal transmission. For example, a UL grant scheduling PUSCH transmission (e.g., DCI formats 0_0 and 0_1) may include CAP type indication information for the UE.

(1) Type 1 Uplink (UL) CAP Method

In the type 1 UL CAP, the length of a time duration spanned by sensing slots sensed to be idle before transmission(s) is random. The type 1 UL CAP may be applied to the following transmissions.

- PUSCH/SRS transmission(s) scheduled and/or configured by the base station
- PUCCH transmission(s) scheduled and/or configured by the base station
- Transmission(s) related to a random access procedure (RAP)

Figure 12:
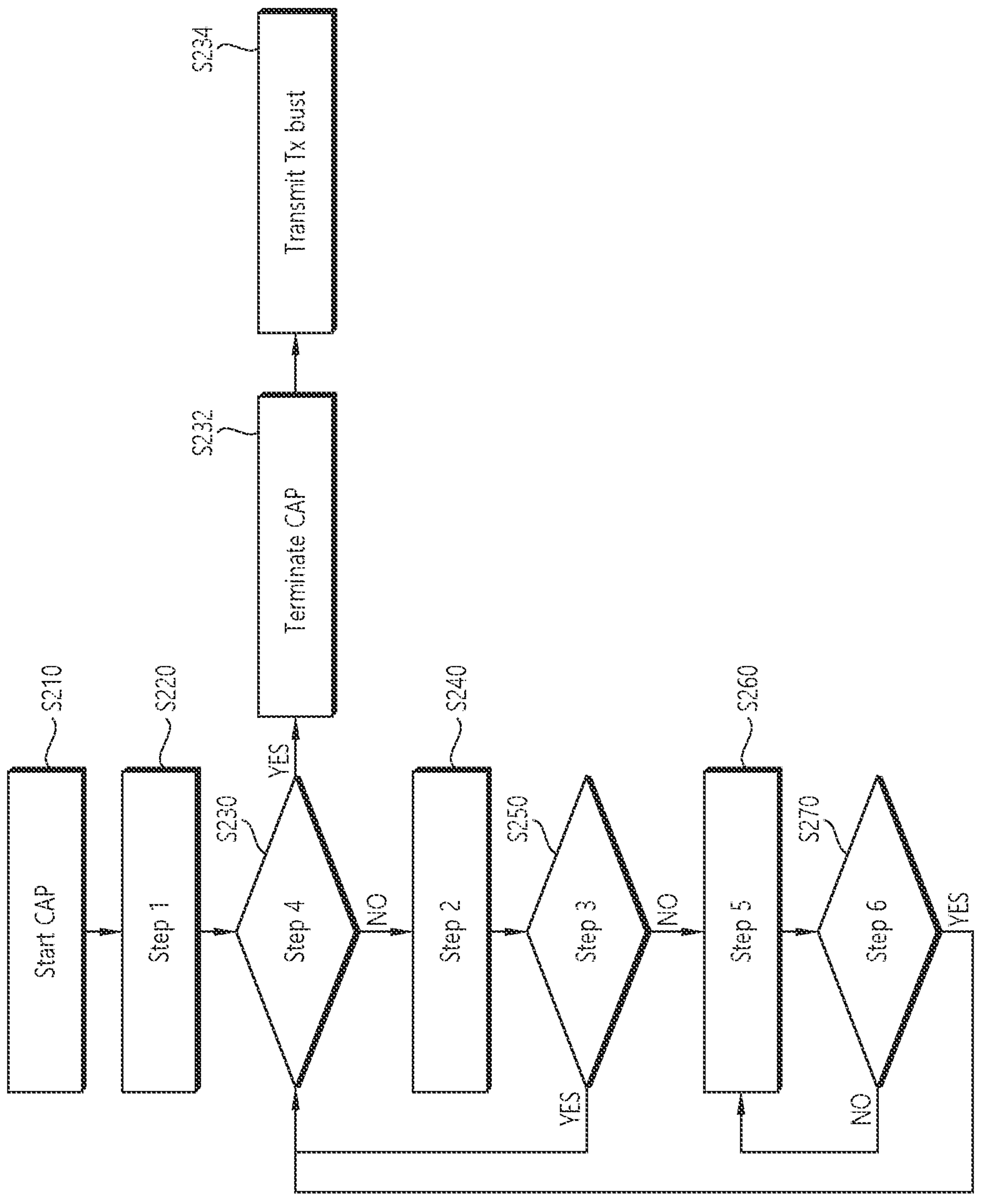
FIG. 12 shows type 1 CAP operations performed by a UE to transmit an uplink signal, based on an embodiment of the present disclosure.

FIG. 12 shows type 1 CAP operations performed by a UE to transmit an uplink signal, based on an embodiment of the present disclosure. The embodiment of FIG. 12 may be combined with various embodiments of the present disclosure.

Referring to FIG. 12, the UE may sense whether a channel is idle for sensing slot durations of a defer duration $T_d$. Then, if a counter N is zero, the UE may perform transmission (S234). In this case, the UE may adjust the counter N by sensing the channel for additional sensing slot duration(s) according to the following steps:

Step 1) (S220) The UE sets N to $N_{init}$ ($N=N_{init}$), where $N_{init}$ is a random number uniformly distributed between 0 and $CW_p$. Then, step 4 proceeds.

Step 2) (S240) If N>0 and the UE determines to decrease the counter, the UE sets N to N−1 (N=N−1).

Step 3) (S250) The UE senses the channel for the additional sensing slot duration. If the additional sensing slot duration is idle (Y), step 4 proceeds. Otherwise (N), step 5 proceeds.

Step 4) (S230) If N=0 (Y), the UE terminates the CAP (S232). Otherwise (N), step 2 proceeds.

Step 5) (S260) The UE senses the channel until either a busy sensing slot is detected within an additional defer duration $T_d$ or all the slots of the additional defer duration $T_d$ are detected to be idle.

Step 6) (S270) If the channel is sensed to be idle for all the slot durations of the additional defer duration $T_d$ (Y), step 4 proceeds. Otherwise (N), step 5 proceeds.

Table 11 shows that $m_p$, a minimum CW, a maximum CW, a maximum channel occupancy time (MCOT), and an allowed CW size, which are applied to the CAP, vary depending on channel access priority classes.

TABLE 11

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Referring to Table 11, a contention window size (CWS), a maximum COT value, etc. for each CAPC may be defined. For example, $T_d$ may be equal to $T_f m_p * T_{sl}$ ($T_d = T_f m_p$*Ti).

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16 us duration.

The following relationship is satisfied: $CW_{min,p} <= CW_p <= CW_{max,p}$. $CW_p$ may be configured by $CW_p = CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next higher allowed value or maintained as it is.

(2) Type 2 Uplink (UL) CAP Method

In the type 2 UL CAP, the length of a time duration spanned by sensing slots sensed to be idle before transmission(s) may be determined. The type 2 UL CAP is classified into type 2A/2B/2C UL CAPs. In the type 2A UL CAP, the UE may perform transmission immediately after the channel is sensed to be idle at least for a sensing duration $T_{short\_dl}$=25 us. Herein, $T_{short\_dl}$ includes the duration $T_f$(=16 us) and one sensing slot duration immediately after the duration $T_f$. In the type 2A UL CAP, $T_f$ includes a sensing slot at the beginning thereof. In the type 2B UL CAP, the UE may perform transmission immediately after the channel is sensed to be idle for the sensing duration $T_f$=16 us. In the type 2B UL CAP, $T_f$ includes a sensing slot within 9 us from the end of the duration. In the type 2C UL CAP, the UE does not perform channel sensing before performing transmission.

For example, according to the type 1 LBT-based NR-U operation, the UE having uplink data to be transmitted may select a CAPC mapped to 5QI of data, and the UE may perform the NR-U operation by applying parameters of the corresponding CACP (e.g., minimum contention window size, maximum contention window size, $m_p$, etc.). For example, the UE may select a backoff counter (BC) after selecting a random value between the minimum CW and the maximum CW mapped to the CAPC. In this case, for example, the BC may be a positive integer less than or equal to the random value. The UE sensing a channel decreases the BC by 1 if the channel is idle. If the BC becomes zero and the UE detects that the channel is idle for the time $T_d$ ($T_d$=$T_f$ $m_p$*$T_{sl}$), the UE may attempt to transmit data by occupying the channel. For example, $T_{sl}$(=9 usec) is a basic sensing unit or sensing slots, and may include a measurement duration for at least 4 usec. For example, the front 9 usec of $T_f$ (=16 usec) may be configured to be $T_{sl}$.

For example, according to the type 2 LBT-based NR-U operation, the UE may transmit data by performing the type 2 LBT (e.g., type 2A LBT, type 2B LBT, or type 2C LBT) within COT.

For example, the type 2A (also referred to as Cat-2 LBT (one shot LBT) or one-shot LBT) may be 25 usec one-shot LBT. In this case, transmission may start immediately after idle sensing for at least a 25 usec gap. The type 2A may be used to initiate transmission of SSB and non-unicast DL information. That is, the UE may sense a channel for 25 usec within COT, and if the channel is idle, the UE may attempt to transmit data by occupying the channel.

For example, the type 2B may be 16 usec one-shot LBT. In this case, transmission may start immediately after idle sensing for a 16 usec gap. That is, the UE may sense a channel for 16 usec within COT, and if the channel is idle, the UE may attempt to transmit data by occupying the channel.

For example, in the case of the type 2C (also referred to as Cat-1 LBT or No LBT), LBT may not be performed. In this case, transmission may start immediately after a gap of up to 16 usec and a channel may not be sensed before the transmission. The duration of the transmission may be up to 584 usec. The UE may attempt transmission after 16 usec without sensing, and the UE may perform transmission for up to 584 usec.

Meanwhile, even if a channel occupancy time (COT) is generated and/or shared, SL communication performed within the COT may (continuously) fail due to interference, transmission by other devices, etc. in an unlicensed band. Even if SL communication (continuously) fails within the COT due to transmission of traffic having high importance, aperiodic transmission by other devices, etc., if the UE (continuously) attempts SL communication within the COT, unnecessary waste of resources may occur and reliability of SL communication may not be guaranteed.

Based on various embodiments of the present disclosure, a method for performing a COT return operation by a UE generating a channel occupancy time (COT) in a sidelink unlicensed spectrum and an apparatus supporting the same are proposed.

Figure 13:
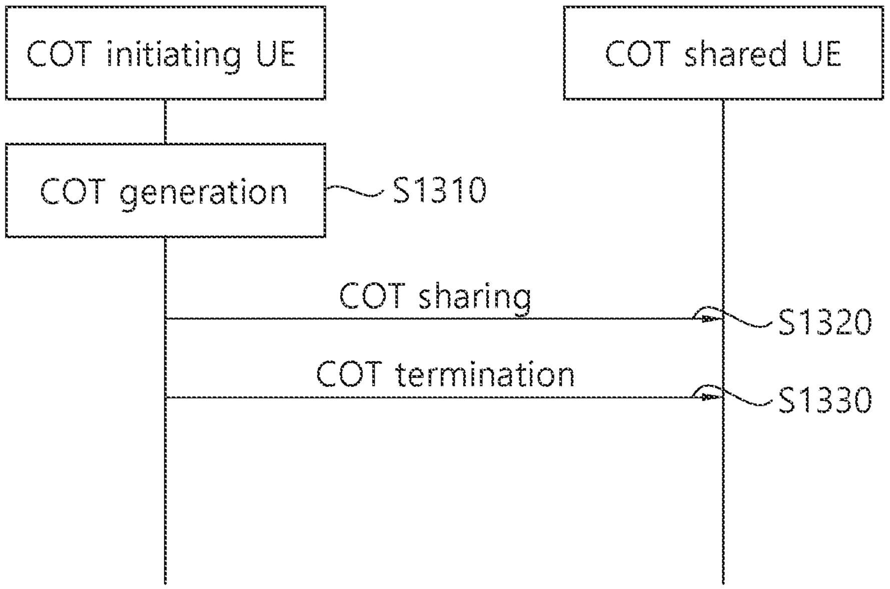
FIGS. 13 to 15 show a procedure for a UE to perform SL communication in an unlicensed band based on a COT, based on an embodiment of the present disclosure.
Figure 14:
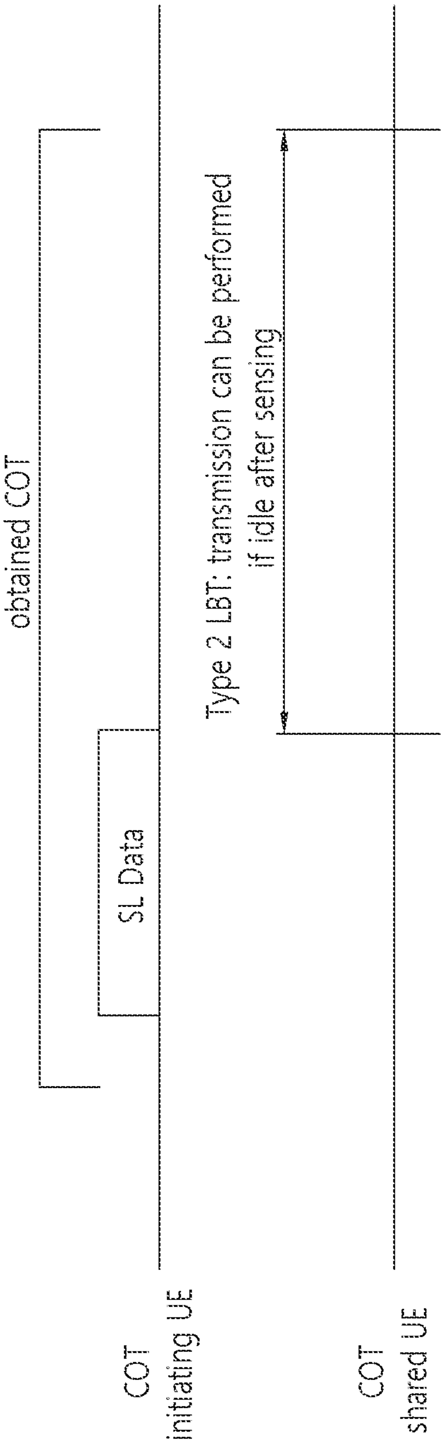
Figure 15:
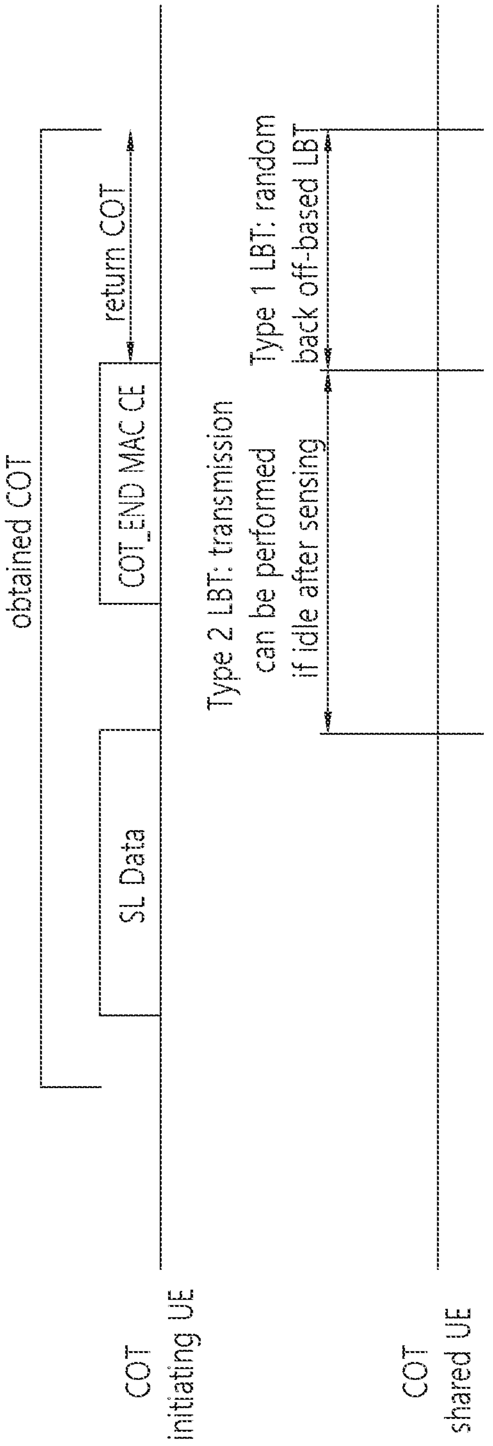

FIGS. 13 to 15 show a procedure for a UE to perform SL communication in an unlicensed band based on a COT, based on an embodiment of the present disclosure. The embodiments of FIGS. 13 to 15 may be combined with various embodiments of the present disclosure.

Referring to FIG. 13, in step S1310, the UE may generate a COT. In step S1320, the UE may share the COT with another UE. For example, the UE that has generated the COT may share the obtained COT of the UE with another UE as in the embodiment of FIG. 14. For example, the UE that has generated/obtained the COT may transfer the obtained COT to another UE through SCI. For example, the UE that has generated/obtained the COT may transfer the obtained COT to another UE through a MAC CE. For example, the UE that has generated/obtained the COT may transfer the obtained COT to another UE through a PC5-RRC message. When transferring the obtained COT through SCI, the UE may transmit the obtained COT to a destination UE (a pair of an L1 source ID and an L1 destination ID) for a unicast link, and/or the UE may transmit the obtained COT to a groupcast/broadcast destination UE (a groupcast/broadcast L1 destination ID). When transferring the obtained COT through a MAC CE, the UE may transmit the obtained COT to a destination UE (a pair of an L1/L2 source ID and an L1/L2 destination ID) for a unicast link, and/or the UE may transmit the obtained COT to a groupcast/broadcast destination UE (a groupcast/broadcast L1/L2 destination ID). The UE that has received the COT from the UE generating the COT may perform, within the shared COT, the type 2 LBT operation after transmission of the UE generating the COT is completed. For example, the type 2 LBT may include the type 2A LBT, the type 2B LBT, or the type 2C LBT. For example, in the case of the type 2A LBT or the type 2B LBT, if the UE performing a sensing operation confirms that a channel is idle for a certain time period, the UE may transmit SL data to be transmitted within the shared COT. For example, in the case of the type 2C LBT, the UE may directly perform SL data transmission without sensing for a certain time period.

In step S1330, the UE that generated the COT may return the COT obtained by itself. The UE generating and/or obtaining the COT and sharing the COT with another UE may transmit a COT END MAC CE to another UE in order to return the obtained COT. The COT END MAC CE may be transmitted to a destination UE (a pair of an L1/L2 source ID and an L1/L2 destination ID) for a unicast link, and/or the COT END MAC CE may be transmitted to a groupcast/broadcast destination UE (a groupcast/broadcast L1/L2 destination ID). Referring to FIG. 15, the UE receiving the COT END MAC CE may transmit SL data by performing the type 1 LBT from a reception time of the COT END MAC CE to an expiration time of the previously shared COT. Until the COT END MAC CE is received, the UE that has shared the COT may transmit SL data by performing the type 2 LBT within the shared COT until the COT expires.

The COT return may be performed not only through a MAC CE but also through SCI or a PC5-RRC message. Information for COT return/termination may be transmitted to a destination UE (a pair of an L1 source ID and an L1 destination ID) for a unicast link through SCI, and/or information for COT return/termination may be transmitted to a groupcast/broadcast destination UE (a groupcast/broadcast L1 destination ID).

For example, whether or not the (some) proposed method/rule of the present disclosure is applied and/or related parameter(s) (e.g., threshold value(s)) may be configured (differently or independently) for each resource pool. For example, whether or not the (some) proposed method/rule of the present disclosure is applied and/or related parameter(s) (e.g., threshold value(s)) may be configured (differently or independently) for each congestion level. For example, whether or not the (some) proposed method/rule of the present disclosure is applied and/or related parameter(s) (e.g., threshold value(s)) may be configured (differently or independently) for each service priority. For example, whether or not the (some) proposed method/rule of the present disclosure is applied and/or related parameter(s) (e.g., threshold value(s)) may be configured (differently or independently) for each service type. For example, whether or not the (some) proposed method/rule of the present disclosure is applied and/or related parameter(s) (e.g., threshold value(s)) may be configured (differently or independently) for each QoS requirement (e.g., latency, reliability). For example, whether or not the (some) proposed method/rule of the present disclosure is applied and/or related parameter(s) (e.g., threshold value(s)) may be configured (differently or independently) for each PQI (5G QoS identifier (5QI) for PC5). For example, whether or not the (some) proposed method/rule of the present disclosure is applied and/or related parameter(s) (e.g., threshold value(s)) may be configured (differently or independently) for each traffic type (e.g., periodic generation or aperiodic generation). For example, whether or not the (some) proposed method/rule of the present disclosure is applied and/or related parameter(s) (e.g., threshold value(s)) may be configured (differently or independently) for each SL transmission resource allocation mode (e.g., mode 1 or mode 2). For example, whether or not the (some) proposed method/rule of the present disclosure is applied and/or related parameter(s) (e.g., threshold value(s)) may be configured (differently or independently) for each Tx profile (e.g., a Tx profile indicating that a service supports sidelink DRX operation or a Tx profile indicating that a service does not need to support sidelink DRX operation).

For example, whether or not the proposed rule of the present disclosure is applied and/or related parameter configuration value(s) may be configured specifically (or differently or independently) depending on whether a PUCCH configuration is supported (e.g., in case that a PUCCH resource is configured or in case that a PUCCH resource is not configured). For example, whether or not the proposed rule of the present disclosure is applied and/or related parameter configuration value(s) may be configured (differently or independently) for each resource pool (e.g., a resource pool with a PSFCH or a resource pool without a PSFCH). For example, whether or not the proposed rule of the present disclosure is applied and/or related parameter configuration value(s) may be configured (differently or independently) for each service/packet type. For example, whether or not the proposed rule of the present disclosure is applied and/or related parameter configuration value(s) may be configured (differently or independently) for each service/packet priority. For example, whether or not the proposed rule of the present disclosure is applied and/or related parameter configuration value(s) may be configured (differently or independently) for each QoS requirement (e.g., URLLC/EMBB traffic, reliability, latency). For example, whether or not the proposed rule of the present disclosure is applied and/or related parameter configuration value(s) may be configured (differently or independently) for each PQI. For example, whether or not the proposed rule of the present disclosure is applied and/or related parameter configuration value(s) may be configured (differently or independently) for each PFI. For example, whether or not the proposed rule of the present disclosure is applied and/or related parameter configuration value(s) may be configured (differently or independently) for each cast type (e.g., unicast, groupcast, broadcast). For example, whether or not the proposed rule of the present disclosure is applied and/or related parameter configuration value(s) may be configured (differently or independently) for each (resource pool) congestion level (e.g., CBR). For example, whether or not the proposed rule of the present disclosure is applied and/or related parameter configuration value(s) may be configured (differently or independently) for each SL HARQ feedback option (e.g., NACK-only feedback, ACK/NACK feedback). For example, whether or not the proposed rule of the present disclosure is applied and/or related parameter configuration value(s) may be configured specifically (or differently or independently) for HARQ Feedback Enabled MAC PDU transmission. For example, whether or not the proposed rule of the present disclosure is applied and/or related parameter configuration value(s) may be configured specifically (or differently or independently) for HARQ Feedback Disabled MAC PDU transmission. For example, whether or not the proposed rule of the present disclosure is applied and/or related parameter configuration value(s) may be configured specifically (or differently or independently) according to whether a PUCCH-based SL HARQ feedback reporting operation is configured or not. For example, whether or not the proposed rule of the present disclosure is applied and/or related parameter configuration value(s) may be configured specifically (or differently or independently) for pre-emption or depending on whether or not pre-emption-based resource reselection is performed. For example, whether or not the proposed rule of the present disclosure is applied and/or related parameter configuration value(s) may be configured specifically (or differently or independently) for re-evaluation or depending on whether or not re-evaluation-based resource reselection is performed. For example, whether or not the proposed rule of the present disclosure is applied and/or related parameter configuration value(s) may be configured (differently or independently) for each (L2 or L1) (source and/or destination) identifier. For example, whether or not the proposed rule of the present disclosure is applied and/or related parameter configuration value(s) may be configured (differently or independently) for each (L2 or L1) (a combination of source ID and destination ID) identifier. For example, whether or not the proposed rule of the present disclosure is applied and/or related parameter configuration value(s) may be configured (differently or independently) for each (L2 or L1) (a combination of a pair of source ID and destination ID and a cast type) identifier. For example, whether or not the proposed rule of the present disclosure is applied and/or related parameter configuration value(s) may be configured (differently or independently) for each direction of a pair of source layer ID and destination layer ID. For example, whether or not the proposed rule of the present disclosure is applied and/or related parameter configuration value(s) may be configured (differently or independently) for each PC5 RRC connection/link. For example, whether or not the proposed rule of the present disclosure is applied and/or related parameter configuration value(s) may be configured specifically (or differently or independently) depending on whether or not SL DRX is performed. For example, whether or not the proposed rule of the present disclosure is applied and/or related parameter configuration value(s) may be configured specifically (or differently or independently) depending on whether or not SL DRX is supported. For example, whether or not the proposed rule of the present disclosure is applied and/or related parameter configuration value(s) may be configured (differently or independently) for each SL mode type (e.g., resource allocation mode 1 or resource allocation mode 2). For example, whether or not the proposed rule of the present disclosure is applied and/or related parameter configuration value(s) may be configured specifically (or differently or independently) for the case of performing (a) periodic resource reservation. For example, whether or not the proposed rule of the present disclosure is applied and/or related parameter configuration value(s) may be configured specifically (or differently or independently) for each Tx profile (e.g., a Tx profile indicating that a service supports sidelink DRX operation or a Tx profile indicating that a service does not need to support sidelink DRX operation).

The proposal and whether or not the proposal rule of the present disclosure is applied (and/or related parameter configuration value(s)) may also be applied to a mmWave SL operation.

Based on various embodiments of the present disclosure, if the UE sharing the COT determines that it is necessary to terminate/return the COT due to interference, transmission by other devices, etc. in the unlicensed band, the UE may transmit information related to COT termination/return. Through this, unnecessary waste of resources cannot occur and reliability of SL communication can be guaranteed.

Figure 16:
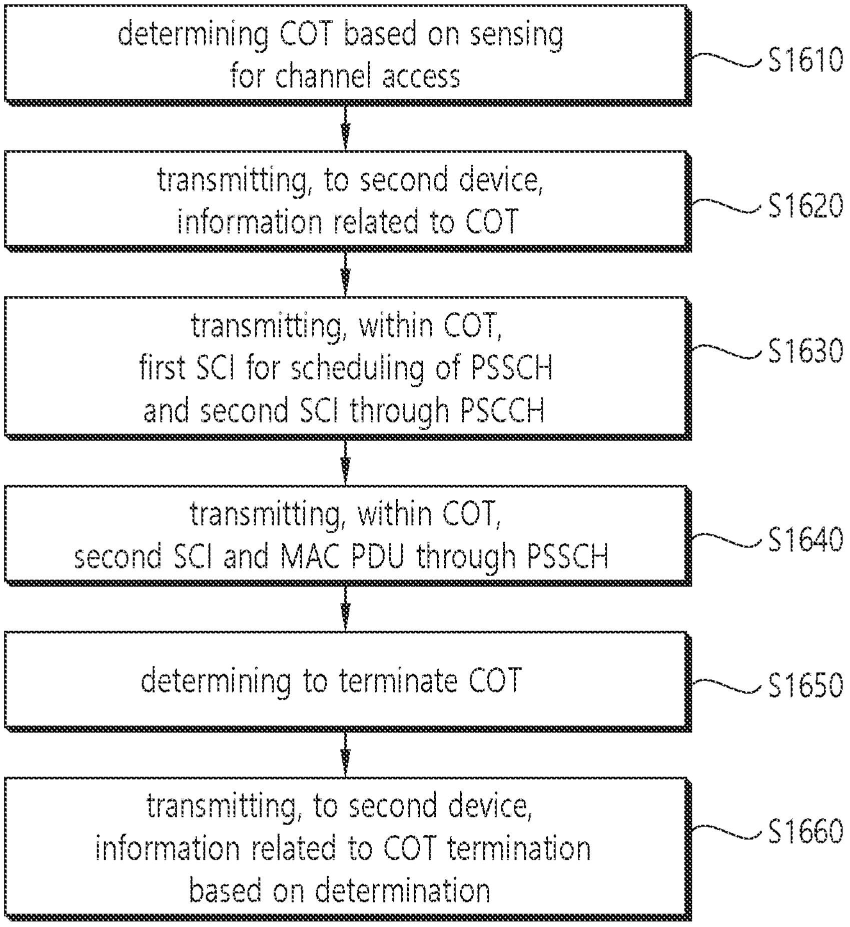
FIG. 16 shows a method for performing wireless communication by a first device, based on an embodiment of the present disclosure.

FIG. 16 shows a method for performing wireless communication by a first device, based on an embodiment of the present disclosure. The embodiment of FIG. 16 may be combined with various embodiments of the present disclosure.

Referring to FIG. 16, in step S1610, the first device may determine a channel occupancy time (COT) based on sensing for channel access. In step S1620, the first device may transmit, to a second device, information related to the COT. In step S1630, the first device may transmit, within the COT, first sidelink control information (SCI) for scheduling of a physical sidelink shared channel (PSSCH) and second SCI through a physical sidelink control channel (PSCCH). In step S1640, the first device may transmit, within the COT, the second SCI and a medium access control (MAC) protocol data unit (PDU) through the PSSCH. In step S1650, the first device may determine to terminate the COT. In step S1660, the first device may transmit, to the second device, information related to COT termination based on the determination.

For example, the information related to the COT termination may be transmitted through a MAC control element (CE).

For example, the information related to the COT termination may be transmitted through SCI.

For example, the information related to the COT termination may be transmitted through a PC5 radio resource control (RRC) message.

For example, the COT may include a first time before the second device receives the information related to the COT termination and a second time after the second device receives the information related to the COT termination.

For example, SL communication within the second time included in the COT may be performed based on a first type listen before talk (LBT). For example, the first type LBT may be a random back-off based channel access procedure.

For example, SL communication within the first time included in the COT may be performed based on a second type listen before talk (LBT). For example, the second type LBT may be a channel sensing procedure performed during a predefined time. For example, the predefined time may be 25 microseconds, 16 microseconds or zero.

For example, the information related to the COT may be transmitted through SCI, a MAC control element (CE) or a PC5 radio resource control (RRC) message.

For example, based on that the COT is shared for unicast, the information related to the COT or the information related to the COT termination may be transmitted for each pair of a destination ID and a source ID.

For example, based on that the COT is shared for groupcast or broadcast, the information related to the COT or the information related to the COT termination may be transmitted for each destination ID.

The proposed method can be applied to device(s) based on various embodiments of the present disclosure. First, the processor 102 of the first device 100 may determine a channel occupancy time (COT) based on sensing for channel access. In addition, the processor 102 of the first device 100 may control the transceiver 106 to transmit, to a second device, information related to the COT. In addition, the processor 102 of the first device 100 may control the transceiver 106 to transmit, within the COT, first sidelink control information (SCI) for scheduling of a physical sidelink shared channel (PSSCH) and second SCI through a physical sidelink control channel (PSCCH). In addition, the processor 102 of the first device 100 may control the transceiver 106 to transmit, within the COT, the second SCI and a medium access control (MAC) protocol data unit (PDU) through the PSSCH. In addition, the processor 102 of the first device 100 may determine to terminate the COT. In addition, the processor 102 of the first device 100 may control the transceiver 106 to transmit, to the second device, information related to COT termination based on the determination.

Based on an embodiment of the present disclosure, a first device adapted to perform wireless communication may be provided. For example, the first device may comprise: at least one transceiver; at least one processor; and at least one memory connected to the at least one processor and storing instructions. For example, the instructions, based on being executed by the at least one processor, may perform operations comprising: determining a channel occupancy time (COT) based on sensing for channel access; transmitting, to a second device, information related to the COT; transmitting, within the COT, first sidelink control information (SCI) for scheduling of a physical sidelink shared channel (PSSCH) and second SCI through a physical sidelink control channel (PSCCH); transmitting, within the COT, the second SCI and a medium access control (MAC) protocol data unit (PDU) through the PSSCH; determining to terminate the COT; and transmitting, to the second device, information related to COT termination based on the determination.

Based on an embodiment of the present disclosure, a processing device adapted to control a first device may be provided. For example, the processing device may comprise: at least one processor; and at least one memory connected to the at least one processor and storing instructions. For example, the instructions, based on being executed by the at least one processor, may perform operations comprising: determining a channel occupancy time (COT) based on sensing for channel access; transmitting, to a second device, information related to the COT; transmitting, within the COT, first sidelink control information (SCI) for scheduling of a physical sidelink shared channel (PSSCH) and second SCI through a physical sidelink control channel (PSCCH); transmitting, within the COT, the second SCI and a medium access control (MAC) protocol data unit (PDU) through the PS SCH; determining to terminate the COT; and transmitting, to the second device, information related to COT termination based on the determination.

Based on an embodiment of the present disclosure, anontransitory computer-readable storage medium storing instructions may be provided. For example, the instructions, based on being executed, may cause a first device to: determine a channel occupancy time (COT) based on sensing for channel access; transmit, to a second device, information related to the COT; transmit, within the COT, first sidelink control information (SCI) for scheduling of a physical sidelink shared channel (PSSCH) and second SCI through a physical sidelink control channel (PSCCH); transmit, within the COT, the second SCI and a medium access control (MAC) protocol data unit (PDU) through the PSSCH; determine to terminate the COT; and transmit, to the second device, information related to COT termination based on the determination.

Figure 17:
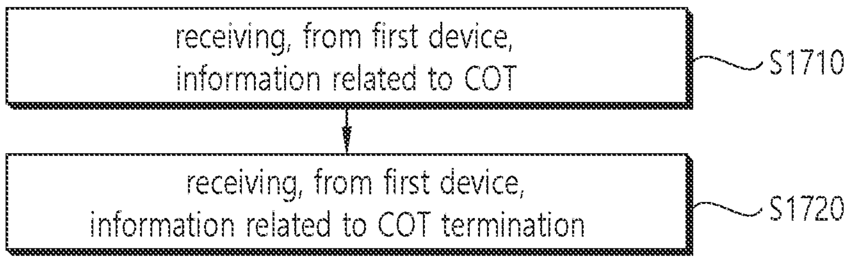
FIG. 17 shows a method for performing wireless communication by a second device, based on an embodiment of the present disclosure.

FIG. 17 shows a method for performing wireless communication by a second device, based on an embodiment of the present disclosure. The embodiment of FIG. 17 may be combined with various embodiments of the present disclosure.

Referring to FIG. 17, in step S1710, the second device may receive, from a first device, information related to a channel occupancy time (COT). In step S1720, the second device may receive, from the first device, information related to COT termination.

For example, the information related to the COT termination may be received through a MAC control element (CE).

For example, the information related to the COT termination may be received through SCI.

For example, the information related to the COT termination may be received through a PC5 radio resource control (RRC) message.

For example, the COT may include a first time before the second device receives the information related to the COT termination and a second time after the second device receives the information related to the COT termination.

For example, SL communication within the second time included in the COT may be performed based on a first type listen before talk (LBT). For example, the first type LBT may be a random back-off based channel access procedure.

For example, SL communication within the first time included in the COT may be performed based on a second type listen before talk (LBT). For example, the second type LBT may be a channel sensing procedure performed during a predefined time. For example, the predefined time may be 25 microseconds, 16 microseconds or zero.

For example, the information related to the COT may be received through SCI, a MAC control element (CE) or a PC5 radio resource control (RRC) message.

For example, based on that the COT is shared for unicast, the information related to the COT or the information related to the COT termination may be received for each pair of a destination ID and a source ID.

For example, based on that the COT is shared for groupcast or broadcast, the information related to the COT or the information related to the COT termination may be received for each destination ID.

The proposed method may be applied to device(s) based on various embodiments of the present disclosure. First, the processor 202 of the second device 200 may control the transceiver 106 to receive, from a first device, information related to a channel occupancy time (COT). In addition, the processor 202 of the second device 200 may control the transceiver 106 to receive, from the first device, information related to COT termination.

Based on an embodiment of the present disclosure, a second device adapted to perform wireless communication may be provided. For example, the second device may comprise: at least one transceiver; at least one processor; and at least one memory connected to the at least one processor and storing instructions. For example, the instructions, based on being executed by the at least one processor, may perform operations comprising: receiving, from a first device, information related to a channel occupancy time (COT); and receiving, from the first device, information related to COT termination.

Based on an embodiment of the present disclosure, a processing device adapted to control a second device may be provided. For example, the processing device may comprise: at least one processor; and at least one memory connected to the at least one processor and storing instructions. For example, the instructions, based on being executed by the at least one processor, may perform operations comprising: receiving, from a first device, information related to a channel occupancy time (COT); and receiving, from the first device, information related to COT termination.

Based on an embodiment of the present disclosure, anon-transitory computer-readable storage medium storing instructions may be provided. For example, the instructions, based on being executed, may cause a second device to: receive, from a first device, information related to a channel occupancy time (COT); and receive, from the first device, information related to COT termination.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
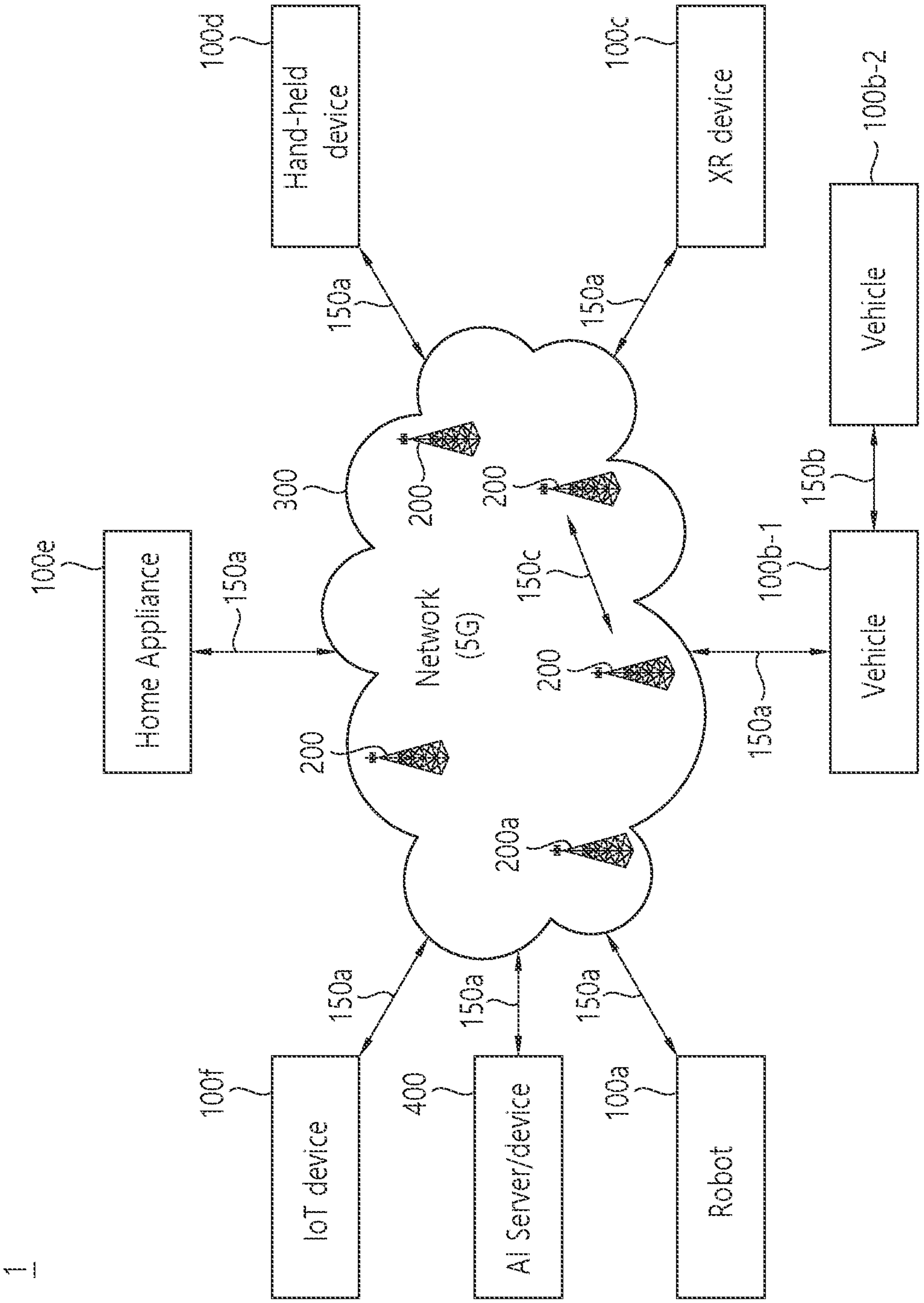
FIG. 18 shows a communication system 1, based on an embodiment of the present disclosure.

FIG. 18 shows a communication system 1, based on an embodiment of the present disclosure. The embodiment of FIG. 18 may be combined with various embodiments of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
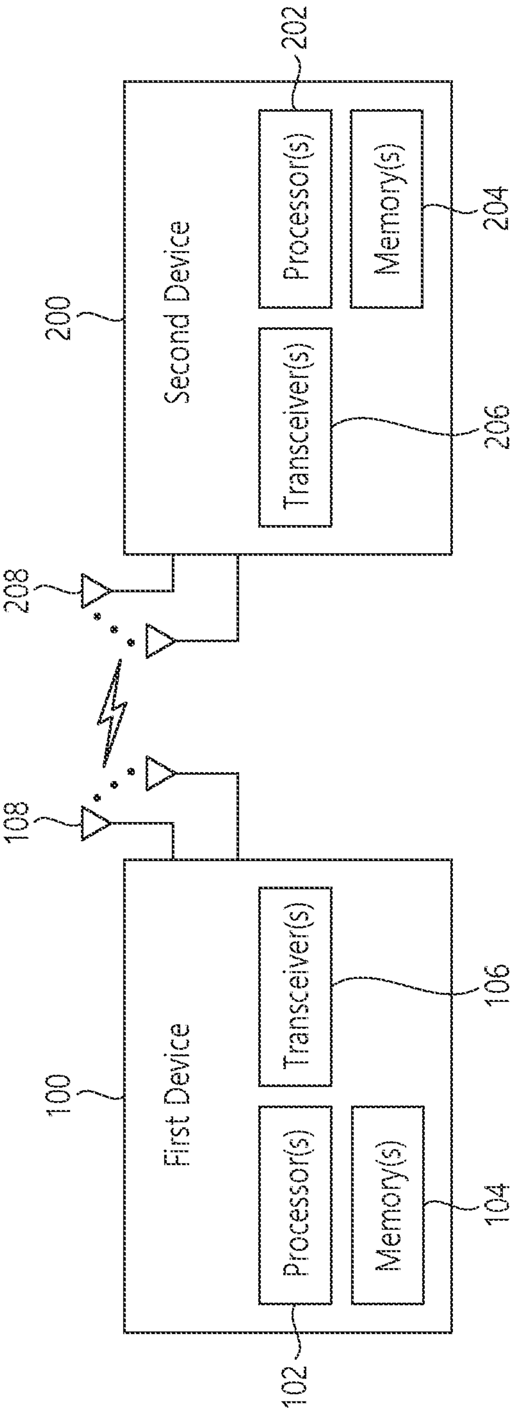
FIG. 19 shows wireless devices, based on an embodiment of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
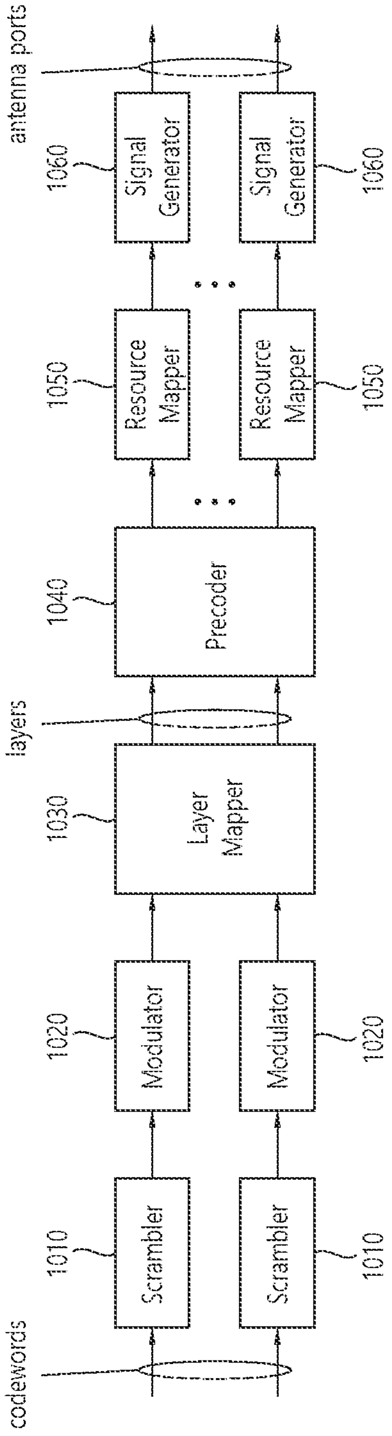
FIG. 20 shows a signal process circuit for a transmission signal, based on an embodiment of the present disclosure.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
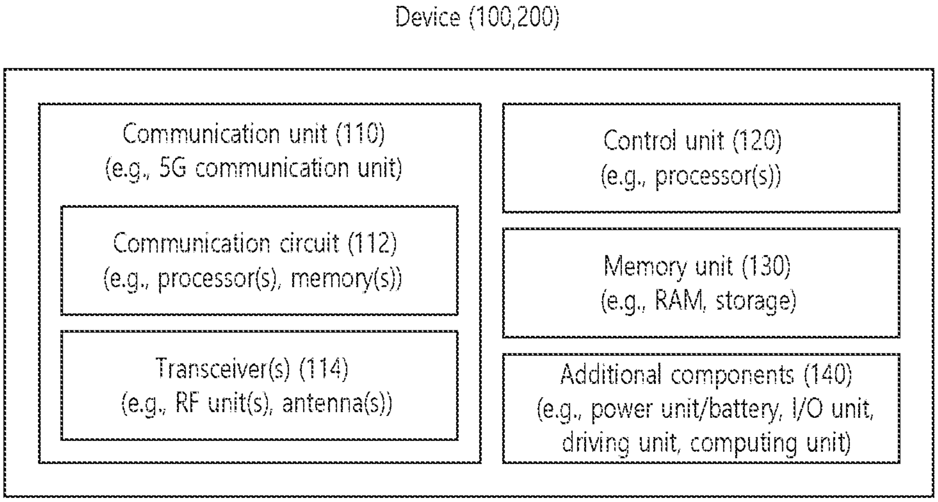
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
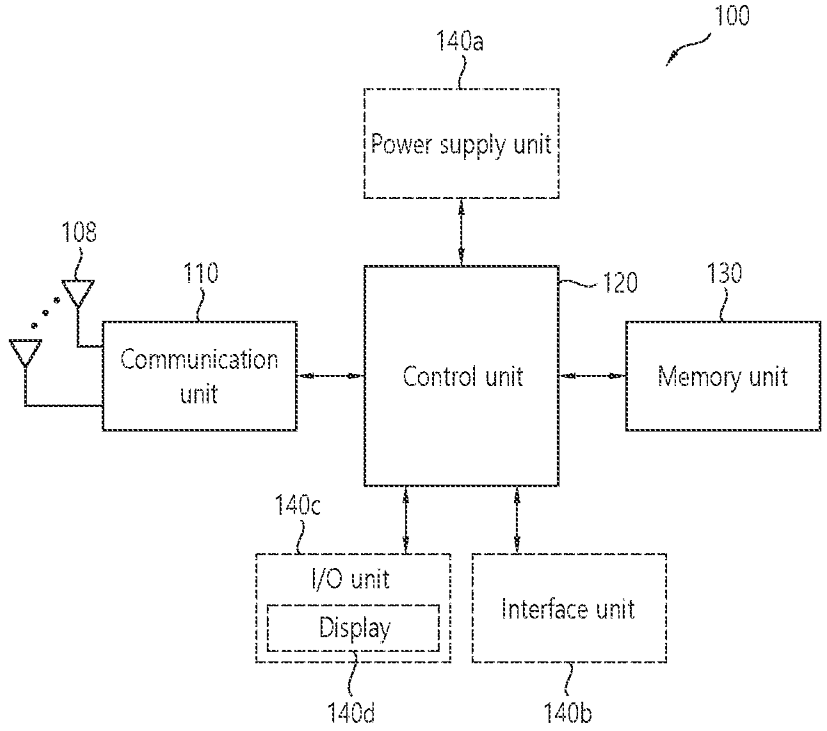
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 23:
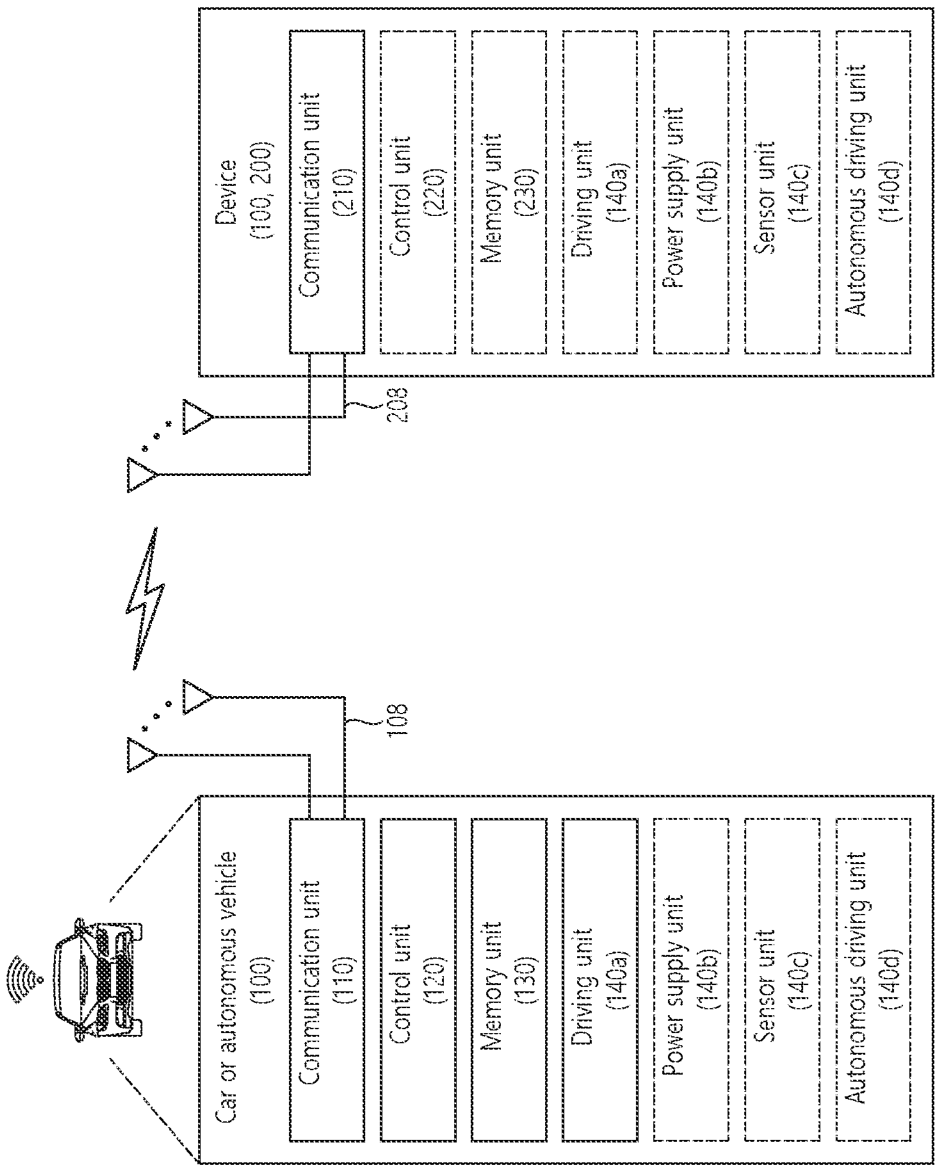
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, comprising:

based on sensing for channel access, determining, by a first device, a channel occupancy time (COT);

transmitting, by the first device to a second device, information related to the COT;

transmitting, by the first device to the second device, within the COT, first inter-user equipment (inter-UE) control information for scheduling of an inter-UE physical shared channel and second inter-UE control information through an inter-UE physical control channel;

transmitting, by the first device to the second device, within the COT, the second inter-UE control information and a medium access control (MAC) protocol data unit (PDU) through the inter-UE physical shared channel;

determining, by the first device, to terminate the COT; and based on the determination of the termination, transmitting, by the first device to the second device, information related to COT termination based on the determination, wherein the COT includes a first time before the transmission of the information related to the COT termination and a second time after the transmission of the information related to the COT termination, wherein inter-UE link communication within the second time included in the COT is performed based on a first type listen before talk (LBT) that is a random back-off based channel access procedure, and wherein inter-UE link communication within the first time included in the COT is performed based on a second type LBT that is a channel sensing procedure performed during predefined time that is (i) at least 25 microseconds, (ii) 16 microseconds, or (iii) 0 microseconds.

2. The method of claim 1, wherein the information related to the COT termination is transmitted through a MAC control element (CE).

3. The method of claim 1, wherein the information related to the COT termination is transmitted through inter-UE control information.

4. The method of claim 1, wherein the information related to the COT termination is transmitted through a PC5 radio resource control (RRC) message.

5. The method of claim 1, wherein the information related to the COT is transmitted through inter-UE control information, a MAC CE or a PC5 RRC message.

6. The method of claim 1, wherein, based on that the COT is shared for unicast, the information related to the COT or the information related to the COT termination is transmitted for each pair of a destination ID and a source ID.

7. The method of claim 1, wherein, based on that the COT is shared for groupcast or broadcast, the information related to the COT or the information related to the COT termination is transmitted for each destination ID.

8. A first device, comprising:

at least one transceiver;

at least one processor; and at least one memory connected to the at least one processor and storing instructions that, based on being executed by the at least one processor, cause the first device to perform operations comprising:

based on sensing for channel access, determining a channel occupancy time (COT);

transmitting, to a second device, information related to the COT;

transmitting, to the second device, within the COT, first inter-user equipment (inter-UE) control information for scheduling of an inter-UE physical shared channel and second inter-UE control information through an inter-UE physical control channel;

transmitting, to the second device, within the COT, the second inter-UE control information and a medium access control (MAC) protocol data unit (PDU) through the inter-UE physical shared channel;

determining to terminate the COT; and based on the determination of the termination, transmitting, to the second device, information related to COT termination, wherein the COT includes a first time before the transmission of the information related to the COT termination and a second time after the transmission of the information related to the COT termination, wherein inter-UE link communication within the second time included in the COT is performed based on a first type listen before talk (LBT) that is a random back-off based channel access procedure, and wherein inter-UE link communication within the first time included in the COT is performed based on a second type LBT that is a channel sensing procedure performed during predefined time that is (i) at least 25 microseconds, (ii) 16 microseconds, or (iii) 0 microseconds.

9. The first device of claim 8, wherein the information related to the COT termination is transmitted through a MAC control element (CE).

10. The first device of claim 8, wherein the information related to the COT termination is transmitted through inter-UE control information.

11. The first device of claim 8, wherein the information related to the COT termination is transmitted through a PC5 radio resource control (RRC) message.

12. A processing device, comprising:

at least one processor; and at least one memory connected to the at least one processor and storing instructions that, based on being executed by the at least one processor, cause a first device to perform operations comprising:

based on sensing for channel access, determining a channel occupancy time (COT);

transmitting, to a second device, information related to the COT;

transmitting, to the second device, within the COT, first inter-user equipment (inter-UE) control information for scheduling of an inter-UE physical shared channel and second inter-UE control information through an inter-UE physical control channel;

transmitting, to the second device, within the COT, the second inter-UE control information and a medium access control (MAC) protocol data unit (PDU) through the inter-UE physical shared channel:

determining to terminate the COT; and based on the determination of the termination, transmitting, to the second device, information related to COT termination, wherein the COT includes a first time before the transmission of the information related to the COT termination and a second time after the transmission of the information related to the COT termination, wherein inter-UE link communication within the second time included in the COT is performed based on a first type listen before talk (LBT) that is a random back-off based channel access procedure, and wherein inter-UE link communication within the first time included in the COT is performed based on a second type LBT that is a channel sensing procedure performed during predefined time that is (i) at least 25 microseconds, (ii) 16 microseconds, or (iii) 0 microseconds.

13. The processing device of claim 12, wherein the information related to the COT termination is transmitted through a MAC control element (CE).

14. The processing device of claim 12, wherein the information related to the COT termination is transmitted through inter-UE control information.

* * * * *